United States Patent [19]
Kobayashi et al.

[11] Patent Number: 5,734,698
[45] Date of Patent: Mar. 31, 1998

[54] CALL SELECTING APPARATUS FOR PREFERENTIALLY CONNECTING EMERGENCY MESSAGE CALLS

[75] Inventors: Tetsuo Kobayashi; Yuji Chikahiro, both of Saitamaken; Hisashi Komura, Kanagawaken, all of Japan

[73] Assignee: Miyoshi & Miyoshi, Tokyo, Japan

[21] Appl. No.: 520,883

[22] Filed: Aug. 30, 1995

[30] Foreign Application Priority Data

Aug. 31, 1994 [JP] Japan .................. 6-206321

[51] Int. Cl.$^6$ ................ H04M 3/00; H04M 11/04
[52] U.S. Cl. .................. 379/45; 379/50; 379/243; 379/289
[58] Field of Search .................. 379/219, 220, 379/221, 286, 283, 50, 45, 127, 288, 289, 37, 243

[56] References Cited

U.S. PATENT DOCUMENTS

| | | | |
|---|---|---|---|
| 3,967,073 | 6/1976 | Anderson et al. | 379/127 |
| 4,042,784 | 8/1977 | Lupatteli et al. | 379/286 |
| 4,192,973 | 3/1980 | Williams et al. | 370/236 |
| 4,839,892 | 6/1989 | Sasaki | 379/45 |
| 4,860,344 | 8/1989 | Jans et al. | 379/113 |
| 4,878,236 | 10/1989 | Ray et al. | 379/45 |
| 5,161,180 | 11/1992 | Chavous | 379/50 |
| 5,218,636 | 6/1993 | Hamilton | 379/286 |
| 5,272,749 | 12/1993 | Masek | 379/211 |

FOREIGN PATENT DOCUMENTS

62-281588  12/1987  Japan.
5-75536  3/1993  Japan.

*Primary Examiner*—Krista Zele
*Assistant Examiner*—Scott Wolinsky
*Attorney, Agent, or Firm*—Banner & Witcoff, Ltd.

[57] ABSTRACT

A call selecting apparatus which comprises a signal receiver section for receiving dial signals in the form of dial pulse or DTMF; a main body processor for effecting call connection processing based on the transmitted digit codes which were received; and a received digit codes accumulating section for accumulating the digit codes received based on the dial signals received by the signal receiver section and which is provided as a peripheral device of the main body processor. The apparatus includes a digit figure decision/call determination section for executing the decision how many digit codes should be accumulated in the received digit codes accumulating section as an accomplished destination telephone number, as well as determining whether the received digit codes correspond to the destination telephone number of a specified call or not. The digit figure decision/call determination section is provided as a peripheral device of the main body processor. The main body processor is arranged so that the result of the received digit codes and that of the determination are collectively inputted thereto. Particularly, the main body processor effects preferentially the connection processing as to the digit codes received in the case where the digit codes received correspond to the destination telephone number of the specified call on the basis of the result of the determination in case of originating call congestion. The result is connection processing can positively be carried out in even an originating call congestion case.

10 Claims, 20 Drawing Sheets

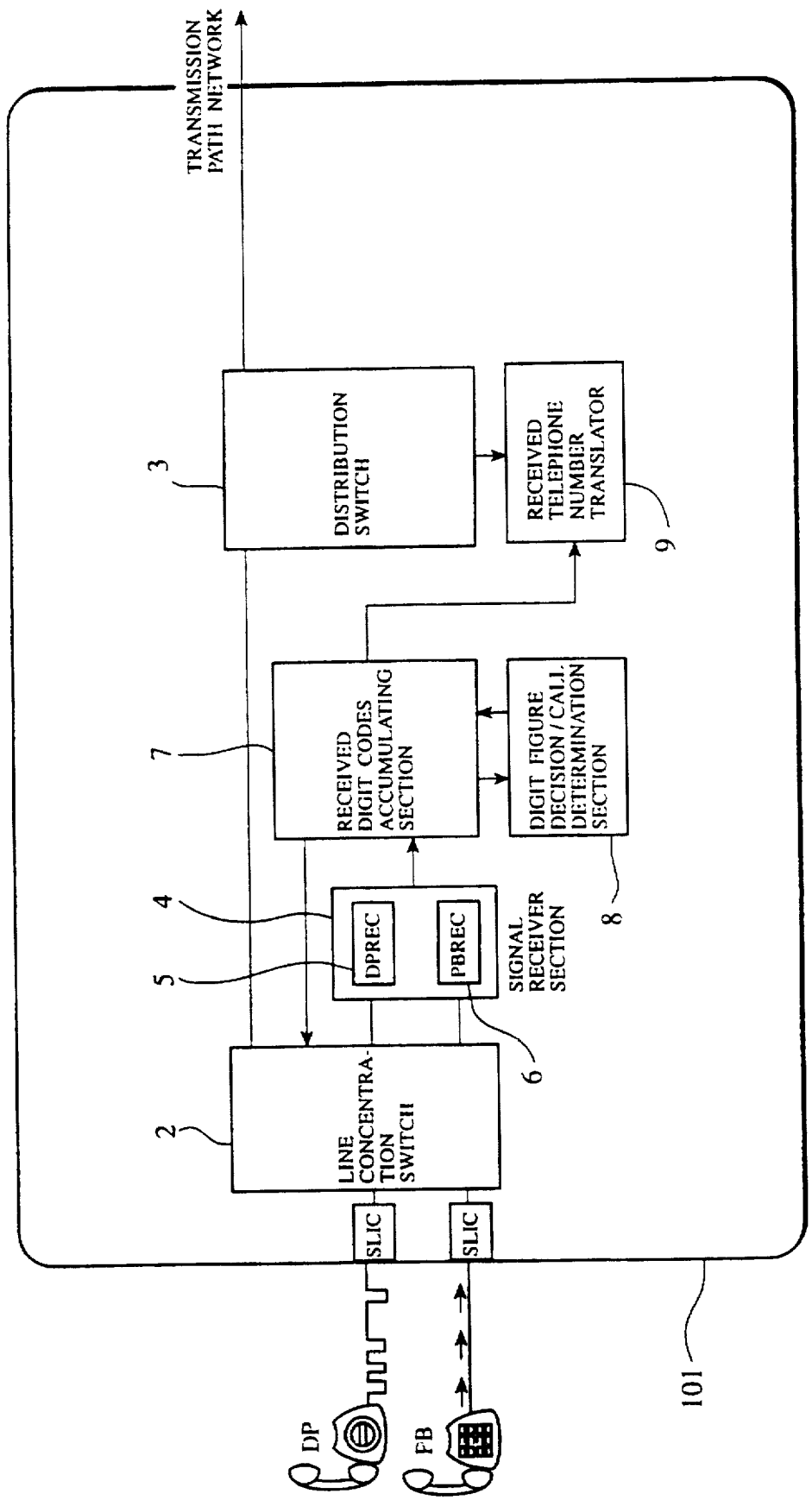

FIG. 9

|  | HOT = CAM87 | HOT = CAM88 |
|---|---|---|
| TEST CALL = NO | CAM87 | CAM88 |
| TEST CALL = YES | CAM88 | CAM87 |

5,734,698

CALL SELECTING APPARATUS FOR PREFERENTIALLY CONNECTING EMERGENCY MESSAGE CALLS

BACKGROUND OF THE INVENTION

1. Field of the Invention

This invention relates to a call selecting apparatus, and more particularly to a call selecting apparatus by which specified calls such as emergency message calls to police stations or to fire stations and the like among a variety of calls can be selectively passed through even in the case where originating call congestion has happened in a local exchange.

2. Prior Art

Heretofore, there have been predetermined priority classes (preferential subscribers/non-preferential subscribers) respectively as to the accommodation to the subscribers accommodated in local exchanges. A control system for controlling call processing in case of originating call congestion wherein the priority classes are adopted is shown in FIG. 1.

In FIG. 1, when a local exchange detects a large amount of call attempts exceeding the call processing capacity, call attempts from only preferential subscribers are accepted to process the calls, while call attempts from non-preferential subscribers are not processed (congestion restriction) in order to prevent the exchange from occurring significant decrease in the throughput of the exchange due to overload and stoppage of the function as well as to prevent telephone network from suppressing the capacity of the telephone network. In other words, when a call attempt was once accepted, the local exchange has to process the call attempt as an originating call up to the connecting processing and moreover the disconnecting processing. Therefore, the number of accept of call attempt (λ number) has to be limited in case of originating call congestion.

More specifically, a priority class (subscriber attribute) is judged after detecting a call attempt, call attempt from a preferential subscriber is accepted to carry out an analysis for call-origination. On the other hand, the call from a non-preferential subscriber is subjected to congestion restriction decision wherein the accept is restricted in case of originating call congestion to demand calling again in accordance with a prescribed announcement, while if originating call congestion is not happened, originating call restriction is not invoked, and the call transits to the stage of check for call-origination. Then, digit codes are received as to the originating call accepted dial pulse signal or DTMF (dial tone multi frequency) signal by, and the digit codes thus received is transferred to a call processing software.

Digit code transfer systems are shown in FIG. 2A wherein the transfer is generally carried out in accordance with the system in which a selected signal receiving apparatus by which, for example, ten digit code signals since #1 till #10 were received from a subscriber transfers the signals to the call processing software without any modification. It is to be noted that the signal receiving apparatus is a part of the peripheral circuit of an exchange main body processor, and the call processing software is practiced in the exchange main body processor.

Furthermore, there is a case where the transfer is carried out in accordance with the system shown in FIG. 2B wherein a signal receiving apparatus accumulates digit codes received since #1, and when all the digit codes since #1 until decision telephone number is accepted (#10) are accumulated, these digit codes are transferred collectively to the call processing software. However, since the signal receiving apparatus does not have a function for decision how many digit codes are required for accomplishment of destination telephone number, the digit codes received since #1 are transferred to the call processing software until the call processing software determines how many digit number required (#3).

As described above, the call processing software executes digit figure determination and translation as the destination telephone number(the system shown in FIG. 2 includes accumulation of the digit codes received in addition to the above), and judges whether the call requires emergency or not, for example, whether or not the call is a message to police or fire stations (hereinafter referred to as "emergency message call"), and whether the call is a one which does not compress the capacity of the telephone network, for example, whether or not the call is a mass calling, and then a prescribed connection processing is effected.

It is to be noted that the determination of digit figure used herein means that an operation is started after receiving a first digit codes, and a received digit figure and a received dial type are extracted, and the determination of digit figure directs a function for effecting early detection of wrong dialing (insufficiency in a digit figure received) and deciding timing for starting up internal processing. This function is called pre-translation.

In the above described prior art system, preference of originating call is determined on the basis of the priority classes of calling subscribers, but it is not determined whether a call should be preferentially connected or not based on the destination telephone number of a party to be communicated (called party). Accordingly, an emergency message call and a mass calling dialed from a non-preferential subscriber cannot be preferentially connected in case of originating call congestion of an exchange. Because, in order to determine whether a call should be preferentially connected or not on the basis of the telephone number being now under the telephonic communication, it is required that the digit codes are received after passing through the above described congestion restriction, then digit figure decision and translation of digit codes as destination telephone number are practiced on the digit codes, whereby call determination can be made. In this respect, however, a conventional system as shown in FIG. 1 does not contain a mechanism for executing these operations.

As is apparent from the above description, in a conventional system based on call processing priority in case of originating call congestion which has heretofore been employed, only the preferential processing of a call dialed based on the preference classes of a subscriber who attempts call is made. Accordingly, the call from non-preferential class subscribers, even if the call is a one to police or fire stations which relates to an emergency case concerning human life or the call does not suppress the capacity of the telephone network, has been limited as in the case of other general calls at the time of congestion, so that the call has never been preferentially connected.

If a call was selected whether or not it should be preferentially connected on the basis of its destination telephone number without any originating call restriction in a conventional system, there appears a load exceeding an exchange main body processor in case of congestion of the exchange, so that there is such a fear that the exchange itself brings about system down. This is because pre-translation and translation are carried out, and then call selecting must be determined in order to attain such determination. In this connection, however, since all the operations are carried out by means of a call processing software in the conventional system as shown in FIG. 1, so that the load increases wholly in the exchange main body processor, whereby the load becomes excessive in case of originating call congestion. Furthermore, in such a situation that all the digit codes received must be transferred to the call processing software in order to execute pre-translation, since the individual digit codes received are transferred at each time to the call processing software at least before decision of the digit figure in the conventional system as shown in FIG. 2 a number of times in the receiving processing becomes extremely significant. As a consequence, it tends to be the load in the exchange main body processor, whereby the load becomes excessive in case of originating call congestion.

Moreover, in such a system wherein table information being used in the processing for deciding a destination telephone number to be preferentially connected or a digit code received as an emergency message call even in case of congestion is fixedly established in the exchange system by determining with or without employment of the software of the main body processor, there are such problems that provision of a manner how to cope with emergency telephone numbers of police or fire stations being different in every countries becomes difficult, and that customization of the leading telephone number in fresh telephone service which is frequently added by an telephone operating company becomes impossible.

However, if the table information used in the processing for deciding a telephone number to be preferentially connected or pre-translation function is made reloadable independently of a determination processing system for emergency message calls, it becomes easy to provide the manner how to cope with emergency message numbers of police or fire stations being different in every countries, and to customize the leading number in fresh telephone service which is frequently to be added.

In Japanese Patent Laid-open Nos. 281588/1987 and 140208/1977 as well as U.S. Pat. No. 4,860,344, there is such a description to the effect that processing for preferential call identification in congestion is carried out in a manner of adding to a conventional software. Furthermore, in Japanese Patent Laid-open No. 75536/1993, a technique to the effect that identification is made whether a call is an emergency call or not by means of a mobile unit terminal. Moreover, in U.S. Pat. No. 4,192,973, while there is such a description to the effect that only when a pattern "999" in dial pulse is received, a signal receiver apparatus which has been inhibited from receiving digit codes is made operative, both the digit codes and the prefix digit codes by which whether the call is an emergency message call or not is determined are fixedly provided.

SUMMARY OF THE INVENTION

An object of the present invention is to provide a call selecting apparatus by which a message to police or fire stations being particularly relevant to human life becomes possible by such a manner that when a call from a non-preferential class subscriber is directed to a called telephone number which has been previously arranged to be preferentially subjected to call processing in case of originating call congestion, the message is preferentially connected to the called telephone number without increasing a load of the exchange main body processor.

Another object of the present invention is to provide a call selecting apparatus by which a mass calling can be selectively passed through in addition to the emergency message call.

A further object of the present invention is to provide a call selecting apparatus by which a load of a call processing software can be also reduced in a usual case other than an congestion case.

A still further other object of the present invention is to provide a call selecting apparatus by which table data employed for executing simultaneously decision of a figure of digit codes with a determination whether a call is a specified call or not are able to be updated without stopping operations of the apparatus.

In order to attain the above described objects, the present invention provides a call selecting apparatus provided with signal receiver means for receiving dial signals in the form of dial pulse or DTMF (dial tone multi frequency) and control means for effecting call connection processing based on the transmitted digit codes which were received, comprising a received digit codes accumulating means for accumulating the digit codes received based on the dial signals received by said signal receiver means and which is provided as a peripheral device of said control means; and digit figure decision/call determination means for executing the decision of the figure of the received digit codes accumulated in said received digit codes accumulating means as well as determination whether the received digit codes correspond to destination telephone number of a specified call or not and which is provided as a peripheral device of said control means; said control means being arranged in such that the result of said received digit codes and that of said determination are collectively inputted thereto.

According to the present invention, the peripheral device executes the processing for deciding a figure of received digit codes and the processing for comparing the received digit codes with specified prefix for certain destination telephone number. Accordingly, such processing does not come to be a load in the control means, so that the same amount of the load can be reduced from the control means.

Furthermore, in the apparatus of the present invention, each one digit code dialed by a subscriber is not informed to the control means in every reception of the digit codes, but the results of figure decision and of determination of emergency message call as well as the whole digit codes obtained are collectively transferred to the control means at a time, whereby the number of communication of the control means with the digit figure decision/call determination means and with the digit codes accumulating means is reduced, so that the load in the control means is also reduced.

Furthermore, the present invention provides a call selecting apparatus wherein said control means effects preferentially the connection processing as to the digit codes received in the case where said digit codes received correspond to the destination telephone number of said specified call on the basis of the result of said determination in case of originating call congestion.

Therefore, even in originating call congestion, since processing for deciding figure of digit codes received and processing for comparing the digit codes received with a specified call number can be executed in a peripheral device, a specified calls such as emergency message call and the like from a non-preferential subscriber can selectively be passed through, in other words, the connection processing can preferentially be executed.

Moreover, taking advantage of the present invention, the exchange is able to enhance its capacity for call processing and tolerance against massive originating calls, which cause originating call congestion and often the exchange system down, while specified calls such as emergency message calls and the like by non-preferential subscribers are able to selectively passed through. More specifically, calling processing in the control means is made technologically advanced to increase the number of calling processing in a usual case, whereby a specified call such as an emergency message call and the like can selectively be passed through in a originating call congestion case without increasing a load on the control means.

In a preferred embodiment of the present invention, said digit figure decision/call determination means executes asynchronously said decision processing for digit figure and said determination processing with the receiving processing by means of said signal receiver means.

The aforesaid digit figure decision/call determination means executes said decision processing for digit figure simultaneously with said determination processing whether or not a call corresponds to the telephone number of said specified call.

Furthermore, the present invention provides a call selecting apparatus wherein said digit figure decision/call determination means is provided with a storing means for storing said specified call number, and the data stored in the storing means are reload able.

As a consequence, the call selecting apparatus acquires such flexibility that the same exchange system can be applied in different territories and countries by altering the data concerning an emergency message telephone number even if the emergency message telephone number differs, for example, in each country.

In a further preferred embodiment of the present invention, the specified call is an emergency message call.

BRIEF DESCRIPTION OF THE DRAWINGS

In the accompanying drawings:

FIG. 3 is a block diagram showing the configuration according to the first embodiment of the call selecting apparatus of the present invention;

FIG. 9 is a diagram showing a selecting logic used in case of reloading the data in the search object data section;

DESCRIPTION OF THE PREFERRED EMBODIMENTS

Figure 1:
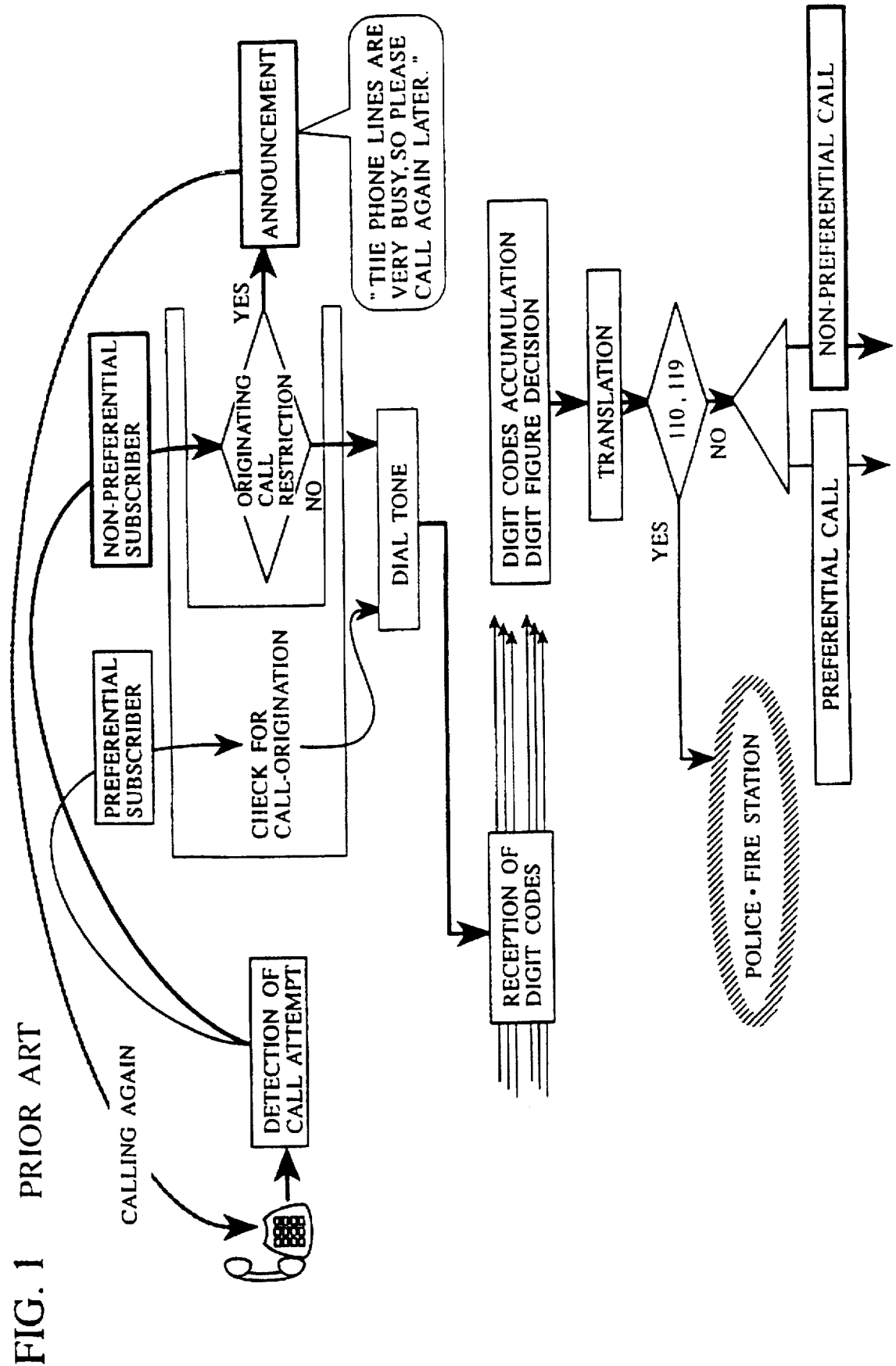
FIG. 1 is a flowchart showing a conventional control system for originating call processing with function of originating call restriction wherein priority classes are utilized.

The embodiments of the present invention will be described in more detail hereinbelow in conjunction with the accompanying drawings.

Embodiment 1

FIG. 3 is a block diagram for explaining the first embodiment of the present invention wherein a call selecting apparatus 101 being an exchange comprising, in accordance with the present invention, a line concentration switch 2, a dial pulse selecting signal receiver (DPREC) 5, a push button signal receiver (PBREC) 6, a received digit codes accumulating section 7, a distribution switch 3, a digit figure decision/call determination section 8 as a means for deciding figure of digit codes received and for discriminating an emergency message call, and a received telephone number translator 9 is shown.

The characteristic feature of the present embodiment resides in such a configuration that both the DPREC 5 and the PBREC 6 are directly connected to the line concentration switch 2, the received digit codes accumulating section 7 is placed immediately after the DPREC 5 and the PBREC 6, and the digit figure decision/call determination section 8 is provided for practicing a table search for determining whether a called telephone number corresponds to the one relating to emergency message calls or not and a table search for executing pre-translation as an integral operation. Herein, the pre-translation is provided between the DPREC 5/PBREC 6 and the received telephone number translator 9, and which operates after receiving the first digit, extracts a digit figure of the digit codes received and a dialing type (general call or abbreviated dialing call), and effects dial tone (DT) stoppage at the time of receiving the first digit.

Furthermore, the characteristic feature of the present embodiment is in that the result is not reported to the main body processor of a local exchange in every times of one digit reception, but the results of digit figure decision and determination of emergency message call are reported together with all the digit codes received to the main body processor of the local exchange.

Moreover, the characteristic feature of the present embodiment resides in a configuration for the provision of a device executing a table search for determination of emergency message call and a table search for decision of digit figure in accordance with a parallel search.

The call selecting apparatus 101 of the present embodiment comprises the line concentration switch 2 as a means for collecting wires, the DPREC 5 as a means for receiving dial pulse signals, the PBREC 6 as a means for receiving DTMF signals, the received digit codes accumulating section 7 as a means for accumulating digit codes received in each of the DPREC 5 and the PBREC 6, the digit figure decision/call determination section 8 as a means for deciding how many digit codes are received to accomplish a telephone number (received digit figure decision) and for determining an emergency message call (comparing the received digit codes with the emergency message call number), the distribution switch 3 as a distribution means, and the received telephone number translator 9 as a means for translating telephone number received.

Now, the signal receiver section 4 for receiving signals which involve digit codes is composed of the DPREC 5 and the PBREC 6.

Figure 4:
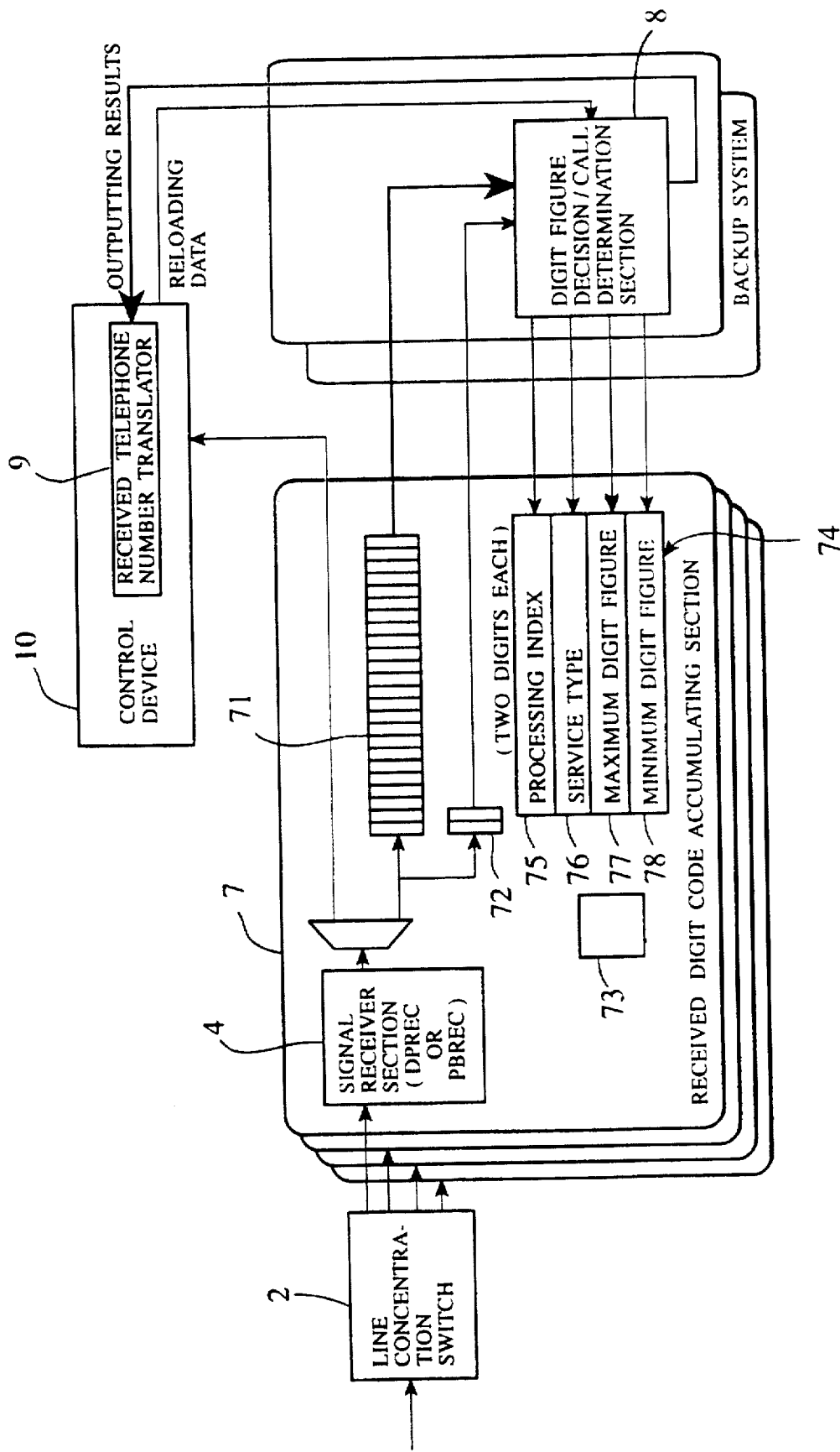
FIG. 4 is a conceptional diagram showing the received digit codes accumulating section according to the first embodiment of the present invention.

The received telephone number translator 9 is mounted on the main body processor of the corresponding exchange (the emergency message call selecting apparatus 101) as shown in the undermentioned FIG. 4. In FIG. 4, the main body processor is illustrated as a control device 10. Namely, the received number translator 9 is realized by a call processing software which is executed in the main body processor.

On one hand, unlike the exchange main body processor (10), the signal receiver section 4, the received digit codes accumulating section 7, and the digit figure decision/call determination section 8 are composed of hardware being peripheral devices of the exchange main body processor (10).

FIG. 4 is a conceptional diagram showing the received digit codes accumulating section 7 which comprises a device (71) for accumulating digit codes received in each of the DPREC 5 and the PBREC 6, a device (72) for storing the figure of the present received digit codes, a device (75) for storing processing index whether digit figure decision is possible based on the digit codes received at the moment or not, devices (77 and 78) for storing the minimum digit figure and the maximum digit figure, respectively, to be received in the case when the digit figure is decided, and a device (76) for storing service types.

While the signal receiver section 4 is not contained in the received digit codes accumulating section 7, the former is shown for the convenience sake in the same figure. Furthermore, a digit interval timer 73 is the one for providing a waiting time for an interval between digits received.

In FIG. 4, signals (dialing signal) from a caller are transmitted to a received digit codes register 71 of, for example, twenty-four digit codes through the signal receiver section 4 to be stored in the register. Further, the figure of the digit codes is counted by means of the digit figure counter 72 of, for example, two digits to be stored therein. The contents of the received digit codes register 71 and the digit figure counter 72 are delivered to the digit figure decision/call determination section 8.

On one hand, the digit codes accumulating section 74 is composed of the processing index (PI) section 75, the service type section 76, the received maximum digit figure section 77, and the received minimum digit figure section 78. These components are composed of registers of two digit, respectively, and they are written from the digit figure decision/call determination section 8.

Figure 5:
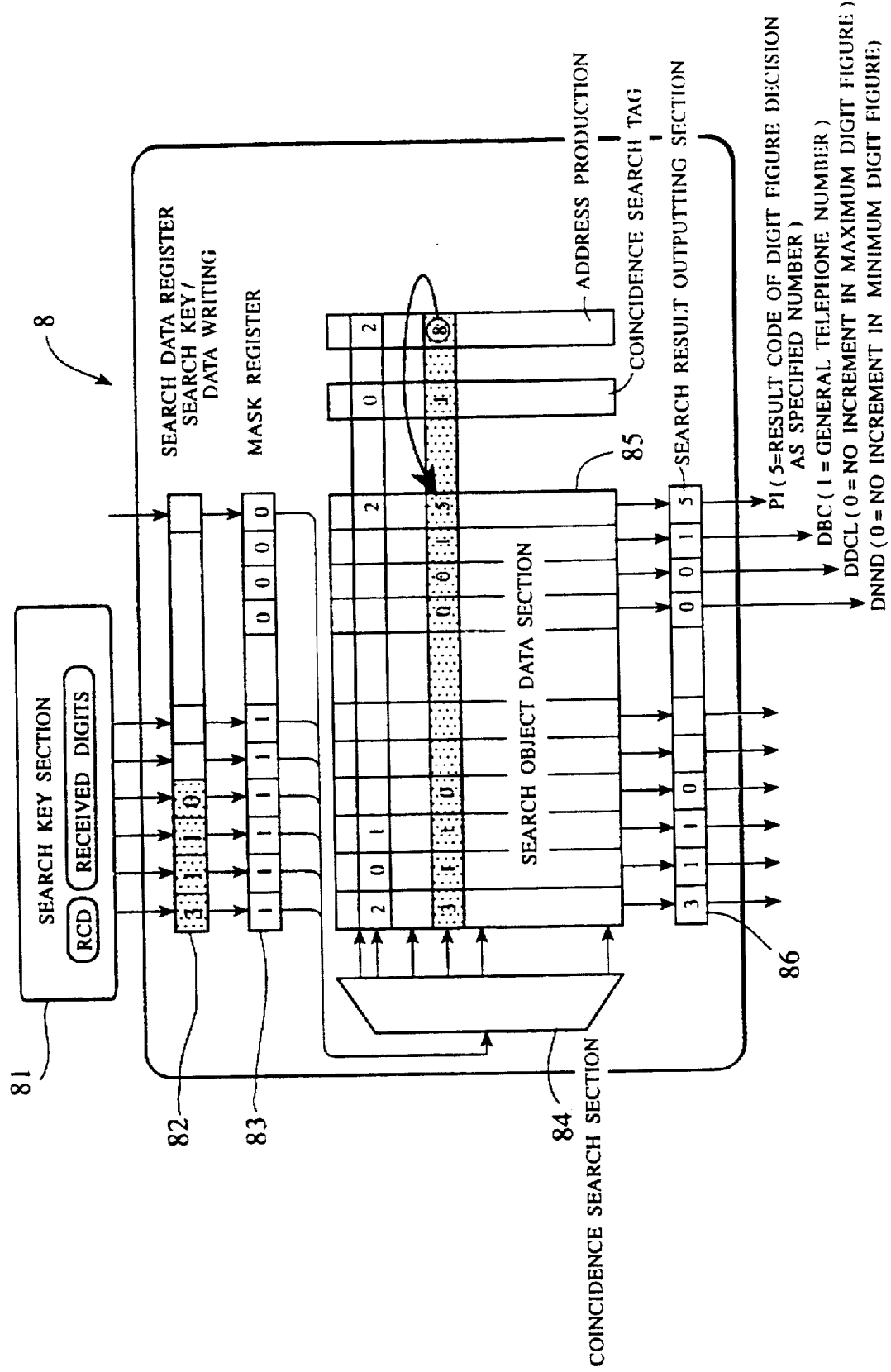
FIG. 5 is a conceptional diagram showing the digit figure decision/call determination section according to the first embodiment of the present invention.

FIG. 5 is a conceptional diagram showing the digit figure decision/call determination section 8 which comprises a search key section 81, a search object data section 85, a coincidence search section 84, and a search result outputting section 86.

In FIG. 5, the digit codes received up to that time obtained from the received digit codes register 7 are introduced into the received digits section of the search key section 81, and the digit codes received are written in a prescribed digit of a search data register 82. The example shown in the figure is "110", and it means an emergency message call to the police in Japan. Likewise the figure received up to that time obtained from the digit figure counter 72 are introduced into the RCD section of the search key section 81, and the figure received are written in the leading digit of the search data register 82. The example shown in the figure is "3", since the figure of "110" is "3".

The contents of the search register 82 are transferred to the coincidence search section 84 through a mask register 83 which masks a part which is not required for search with "0", and the contents are used for the search in the search object data section 85. This search is parallelly (simultaneously) effected with respect to an entry of the search object data section 85. For this purpose, the search object data section 85 is composed of, for example, CAMs (Content Addressed Memories), and search keys are inputted at the same time with respect to respective entries. When the search keys are coincident with search object data, prescribed contents are outputted to the search result outputting section 86. In the example illustrated in the figure, the search key (being also search results) of "3110" and the search result of "0015" are outputted. The contents of the search result outputting section 86 are transferred to, for example, the received telephone number translator 9, and a part "0015" of search results is transferred to the received digit codes accumulating section 7 to be set in the digit codes accumulating section 74.

Then, the lowest digit "5" in the search result "0015" is written in the processing index section 75. The lowest numeral "5" is a special number (emergency message call), and it is an index indicating that the figure of digit codes as telephone number is decided on the basis of the digit codes received up to the present time. Thereafter, "1" in the search result "0015" is written in the service type section 76. "1" shows that it is a general telephone number. It is to be noted that since there is a case where a usual call should be made to be an emergency message call dependent upon service types, it is judged by referring to also this numeral whether the call is an emergency message call or not. Then, the "0" on the subordinate side in the search result "0015" is written in the received maximum digit figure section 77. In this case, "0" means that there is no increment in the maximum digit figure. On one hand, "0" at the most significant digit in the search result "0015" is written in the received minimum digit figure section 78. The "0" means that there is no increment in the minimum digit figure in this case.

As described above, the decision of digit figure by means of the digit codes ("110") at that time as well as the determination to the effect that a call is an emergency message call can be effected by one search of a table (search object data section). More specifically, since the processing index is "5" and the service type is "1", it is possible to determine that the digit figure is decided at that time and that the destination of the call is an emergency.

Thus, in the present embodiment, the pre-translation processing of digit codes received can simultaneously be carried out with the collation processing whether or not the digit codes received correspond to an emergency message call number. Furthermore, a processing rate of the associative memory used in the digit figure decision/call determination section 8 is 1000 times or more higher than that of the receiving processing of signals from respective callers in the received digit codes accumulating section 7. Accordingly, there is no need of synchronization with the receiving processing of dial number as a turning-point, but the pre-translation processing and the collation processing whether or not a call corresponds an emergency message call number are sufficient for effecting such a manner that a received digit codes memory is scanned successively in every callers as a routine work, and as a consequence the determined results are written in the processing index section 75 which is provided in every received digit codes accumulating sections 7 and the like sections.

Next, operations of the embodiment of the present invention will be described hereinbelow.

When a subscriber intends to dial on pulse type terminal, the subscriber's line is connected to the DPREC 5 through the line concentration switch 2. As a result, the dial signals delivered from the subscriber are received by the DPREC 5, and the one digit codes received is accumulated in the received digit codes accumulating section 7, so that a value of the figure being the present received digit codes which have been stored in the received digit codes accumulating section 7 increases by "one".

On the other hand, when a subscriber intends to dial on DTMF type terminal, the subscriber line is connected to the PBREC 6 through the line concentration switch 2. As a result, the dial signals delivered from the subscriber are received by the PBREC 6, and the one digit codes received is accumulated in the received digit codes accumulating section 7, so that a value of the figure being the present received digit codes which have been stored in the received digit codes accumulating section 7 increases by "one".

The digit figure decision/call determination section 8 reads out periodically the received digit codes and the present digit figure of received digit codes in the received digit codes accumulating section 7, such determination whether or not the figure of the dial code accomplished is decided on the basis of the digit codes dialed until the present time and such determination whether or not a call is an emergency message call are carried out by one table search, the results obtained are outputted to the search result outputting section 86, and the results are written in the processing index section 75, the received minimum digit figure section 78, the received maximum digit figure section 77, and the service type section 76, of the digit codes accumulating section 74, respectively.

For the sake of executing asynchronously and parallelly the accumulation processing of received digit codes with and to the operation of the digit figure decision/call determination section 8, it is desirable that a cycle for the read-out and the determination is set sufficiently shorter than (the minimum cycle of digit codes received)/(the number of places stored in the digit codes accumulating section).

Until the decision what the figure of the digit codes is at accomplishment of a telephone number and the determination whether a call is an emergency message call or not are completed, the periodic read-out from the received digit codes accumulating section 7 and the determination are repeated by means of the above described digit figure decision/call determination section 8. After completing the digit figure decision and the determination whether or not a call is an emergency message call, and either the case when the present digit figure of received digit codes becomes equal to the maximum digit figure obtained by the digit figure decision or the case when a interval time between the digit codes themselves exceeds a timer value between the digits after the present figure of digit codes received exceeds the minimum digit figure obtained by the digit figure decision, all the digit codes received up to that time are collectively delivered to the main body processor (control device 10). The delivery is carried out from the received digit codes accumulating section 7 to the control device 10. More specifically, it is arranged in such that the one obtained by adding the contents of the processing index section 75, the service type section 76, the received maximum digit figure section 77, and the received minimum digit figure section 78 of the digit codes accumulating section 74 (they are allowed to obtain by received digit codes decision section 8) to all the digit codes received in the received digit codes register 71 and the received digit figure in the digit figure counter 27 is delivered, whereby it is concluded that the result of determination whether or not a call corresponds to an emergency message call can be added.

Figure 6:
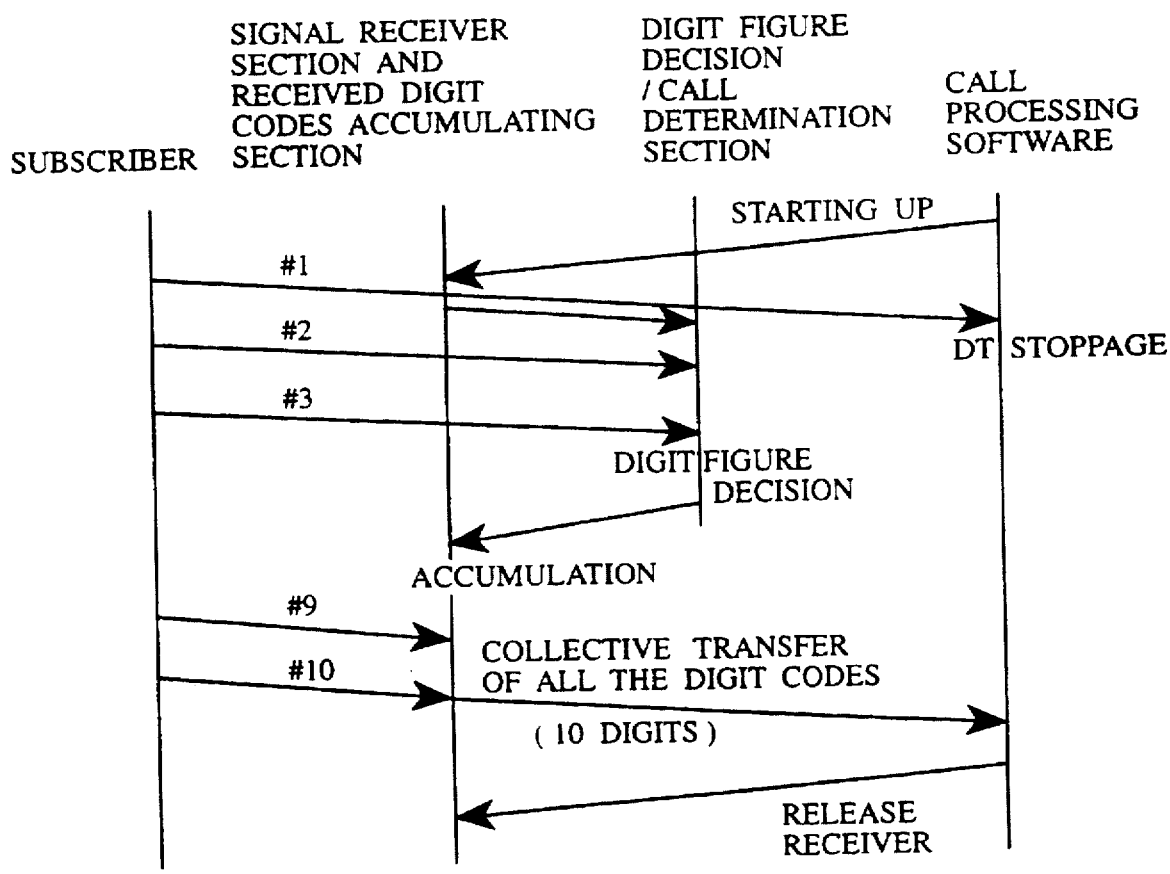
FIG. 6 is a diagram showing a procedure for transferring signals concerning digit codes received from a peripheral device to the main body processor.

FIG. 6 is a diagram showing a transfer of digit codes received from a peripheral circuit to the exchange main body processor (control device 10) or a call processing software wherein first digit code #1 or the like from a caller is stored in the signal receiver section (peripheral circuit), and before a digit figure is decided, for example, dial codes from #1 to #3 are used therefor. Accordingly, the dial codes are never transferred to the call processing software for the sake of deciding digit figure. Either after the digit figure is made and when the present digit figure of digit codes received became equal to the maximum digit figure obtained by the digit figure decision, or after the present digit figure of digit codes received exceeded the minimum digit figure obtained by the decision of digit figure and when a waiting time between digits codes received exceeded a timer value between digits, all the received digit codes from #1 to #10 up to that time are collectively be transferred to the call processing software.

Figure 2A:
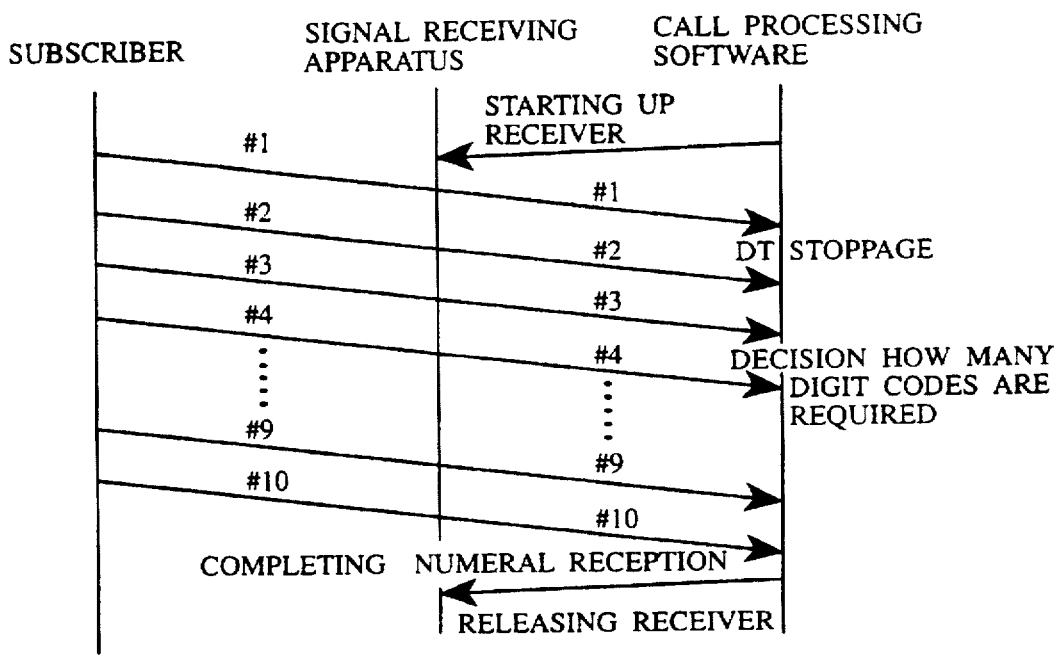
FIG. 2A and FIG. 2B are diagrams each showing a conventional system for transferring digit codes received.
Figure 2B:
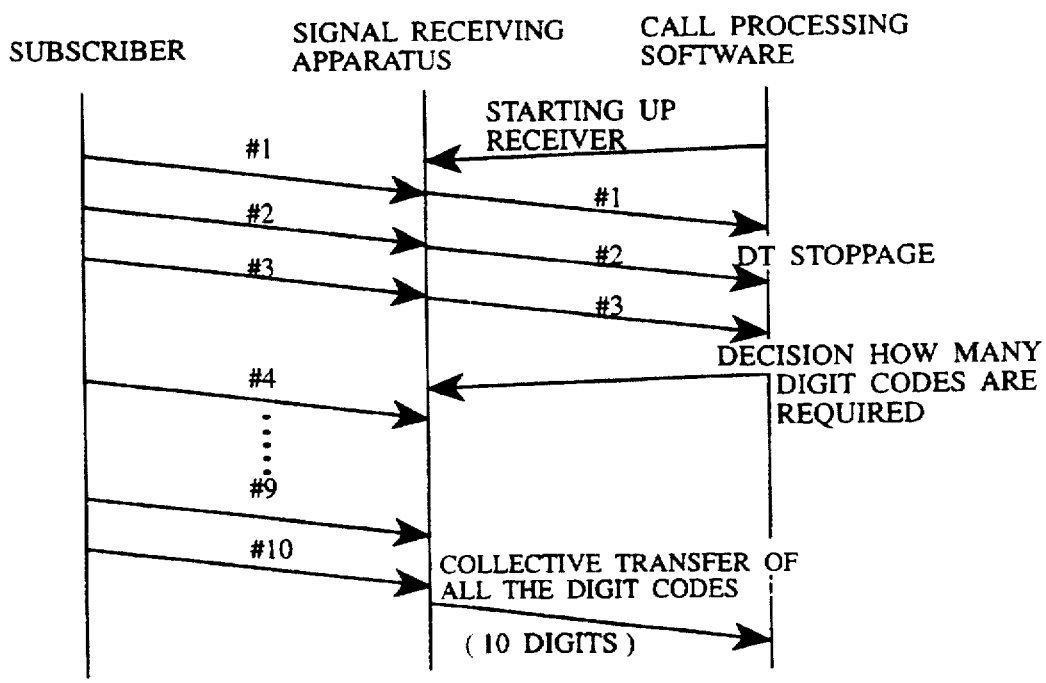

Consequently, the call processing software is not required for the digit codes accumulation and the digit figure decision as in the system shown in FIG. 2A, or the call processing software is not required for the digit figure decision as in the system shown in FIG. 2B. Furthermore, there is no need of receiving processing in each time or until the digit figure is decided with respect to digit codes received. Accordingly, it is sufficient that the call processing software executes one receiving processing with respect to digit codes received, and further that the call processing software executes only the received digit codes translation with respect to all the digit codes received, so that the load can significantly be reduced.

After all the digit codes decided by the digit figure decision were collectively delivered, the peripheral circuit makes the present digit figure of digit codes received to be 0 and initializes the processing index section 75, the received minimum digit figure section 78, the received maximum digit figure section 77, and the service type section 76 of the digit codes accumulating section 74, respectively, whereby a preliminary arrangement for the following digit codes reception is carried out.

On the other hand, the exchange main body processor (control device 10) or the call processing software makes a translation of digit codes received in the received telephone number translator 9, and if a call corresponds to an emergency message call on the basis of the determined result added, connection processing is preferentially carried out.

While an emergency message call with respect to police, fire and the like stations has been described in the above-mentioned embodiment, a call is not limited to that described above, it may be mass callings such as telephonic voting, broadcasting by an announcement machine, and the like.

As described above, it is arranged in such that the data in the search object data section 85 is made reloadable so as to cope with not only an emergency message call, but a mass calling in the present invention.

A method for reloading the number which should be preferentially connected and the data employed for decision of a figure of the digit codes received stored in the search object data section 85 will be described hereinbelow.

Figure 7:
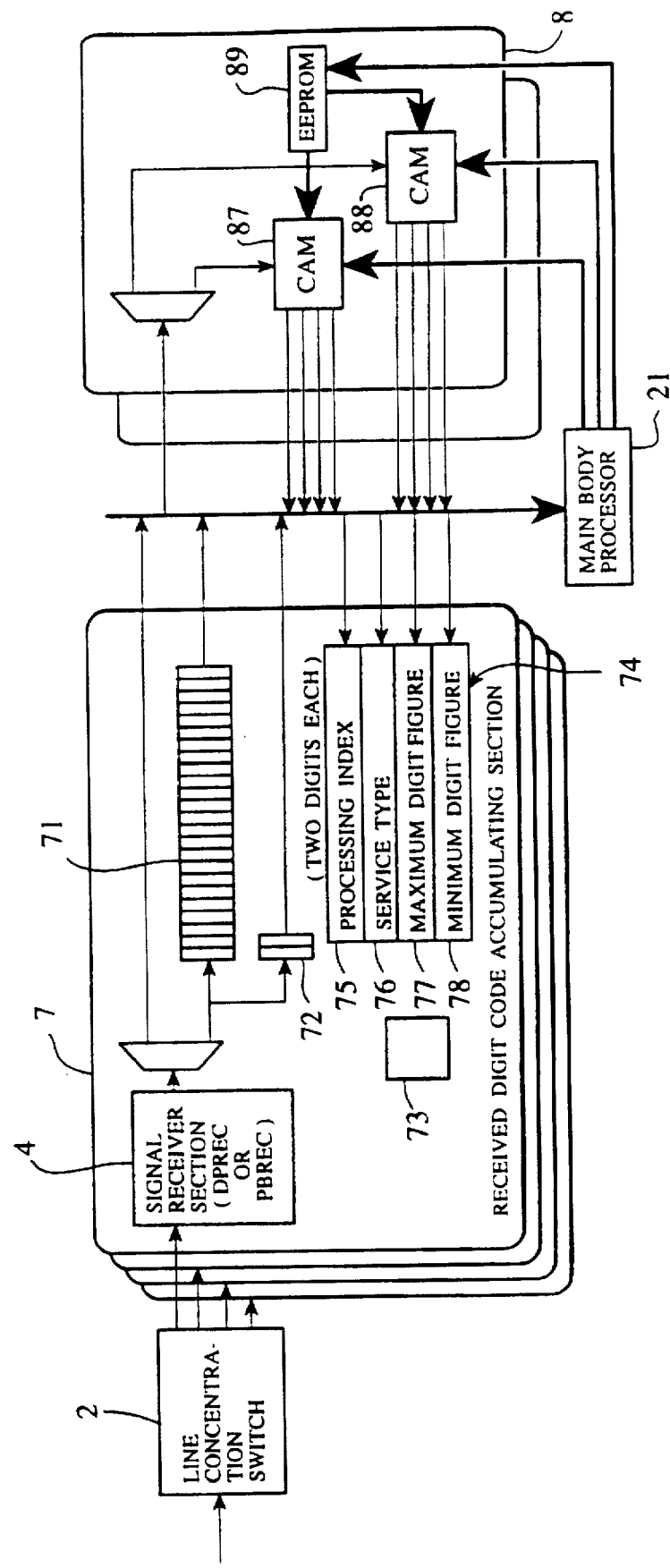
FIG. 7 is a configuration diagram showing a manner for making data in a search object data section reloadable.

FIG. 7 is a diagram showing a configuration of the manner wherein the data in the search object data section 85 are made reloadable in which the digit figure decision/call determination section 8 is provided with two associative memories (CAMs) 87 and 88 from the viewpoint of hardware in order that the digit figure decision/call determination section 8 makes the search object data section 85 reloadable. The digit figure decision/call determination section 8 is held in common with a plurality of the received digit codes accumulating sections 7, and it is composed of two systems of a hot system and a stand-by system.

In order to be reloadable, an address-in terminal designating a data storage address with respect to the CAMs 87 and 88, a storage data input terminal, and a terminal specifying either a search mode or a data reloadable mode are required.

Figure 8:
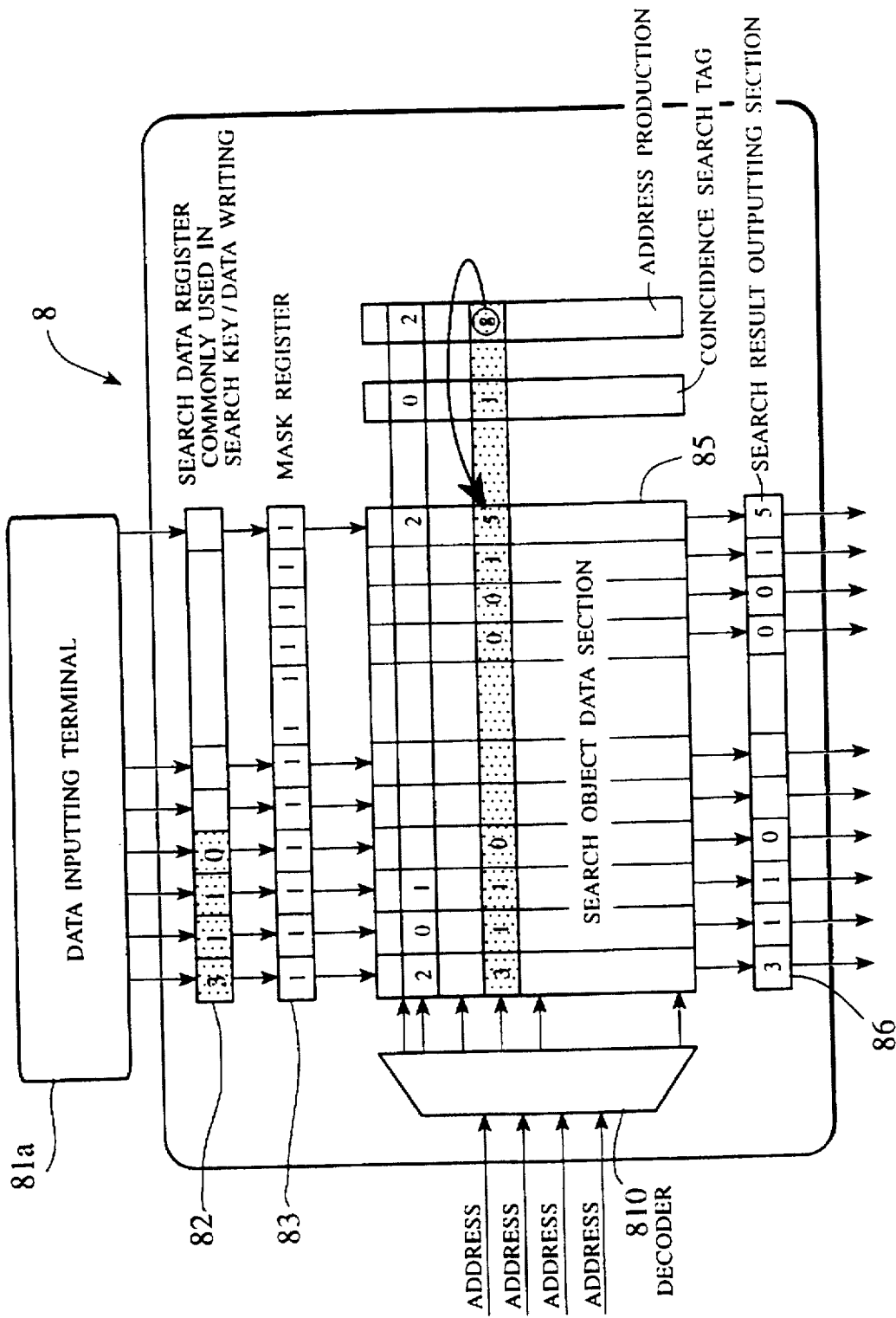
FIG. 8 is a conceptional diagram showing the digit figure decision/call determination section in case of a data reloadable mode.

FIG. 8 is a conceptional diagram showing the digit figure decision/call determination section 8 in case of a data reloadable mode in which the configuration where a search key section is commonly used with a data input terminal is shown. Such common use as described above makes possible to economize the circuit implementation. Further, the mode designating terminal may be mounted to a controller (not shown) which effects decoding of a command and the like.

Referring to FIGS. 7 and 8, a procedure for updating data in the case where 0- and 1-systems of the digit figure decision/call determination section 8 are operated in a HOT-HOTSBY mode will be described hereinbelow.

The data are downloaded into a backup CAM on an ACT-system digit figure decision/call determination section 8. Then, verification processing is carried out with respect to the data. The data transferred from the backup CAM on the ACT-system digit figure decision/call determination section 8 to a backup CAM on a SBY-system digit figure decision/call determination section 8 through a common confounding. The data of the backup CAM on the SBY-system digit figure decision/call determination section 8 is subjected to collating verification processing with the data of the transfer source. Then, a test call via the CAM on the ACT-system digit figure decision/call determination section 8 is passed through. When the data transfer and the verification processing were normally executed, it is presumed that a test call will be normally passed through in also the case of the CAM on the SBY-system digit figure decision/call determination section 8. Each hot CAM and each backup CAM are switched with respect to both the digit figure decision/call determination sections 8 on the ACT- and SBY-systems, respectively, at the same time. Thereafter, a series of the above described processes other than the switching process are executed with respect to a fresh backup system of the CAMs. The newly obtained data are written into an EEPROM 89, and finally verification processing of the data is carried out.

In every time when data are applied to a data input terminal, the address corresponding thereto shall be inputted to a decoder 810. Furthermore, the mask processing by means of a mask register 83 is not effected at the time of writing data, and a value of the search result outputting section 86 is to be ignored.

In the meantime, as a matter of course updating of data must be executed without interrupting the pre-translation processing now on execution, it is essential to have a function for passing a test call through to verify the execution of normal updating of the data by the use of a fresh table before switching the present table.

For this reason, it is necessary that two CAMs 87 and 88 are provided in the digit figure decision/call determination section 8 of the same system, and a function of utilizing the CAMs reloaded as a result of the identification of only a test call before the present switching is added. In the two CAMs 87 and 88 mounted on the digit figure decision/call determination section 8 of the same system, the recognition which is the hot CAM is per formed by the digit figure decision/call determination section 8 itself. As a consequence, a CVM-processor 21 becomes not to require that the number of the CAMs is not specified as an argument in case of causing the digit figure decision/call determination section 8 to connect by indicating to the effect that it is a test call.

Furthermore, the identification to the effect that a call is a test call is practiced in the starting-call analysis prior to a reservation of the received digit codes accumulating section 7. More specifically, the CVM-processor 21 sends instructions of "reservation of the received digit codes accumulating section 7" and "employment of CAM" to the digit figure decision/call determination section 8 and at the same time, the same contents are instructed as a message. Now, the selection logic wherein a call should be passed through which CAM in the CAMs mounted on the digit figure decision/call determination section 8 of the same system in response to the indication whether or not a call is a test call is shown as a table in FIG. 9.

As shown in the above-mentioned embodiment, according to the present invention, preferential connection processing can be effected with respect to a specified call without applying an excessive load to the main body processor in particularly an congestion case. Even if a situation is not in an congestion case, a load of the main body processor can be reduced. Moreover, the specified call can be arbitrarily set, besides the alteration is also easily possible.

In the present embodiment, both the DPREC 5 and the PBREC 6 have been disposed at the succeeding stage of the line concentration switch 2 to terminate the circuit, and this is the simplest configuration wherein the DPREC 5 and the PBREC 6 are equally treated in view of a hardware configuration. According to this configuration, the constitution of a pre-translation mechanism becomes simplest, so that it is sufficient to dispose the mechanism in every line concentration switches 2. Furthermore, since the DPREC 5 and the PBREC 6 can provide the same interface with respect to a translation mechanism, it is advantageous in view of a software configuration. This is because pre-translation and translation are mere interpretation of digit codes, and they are irrespective of differences in subscriber signal type such as dial pulse (DP) and DTMF which is called PB in Japan.

Embodiment 2

Figure 10:
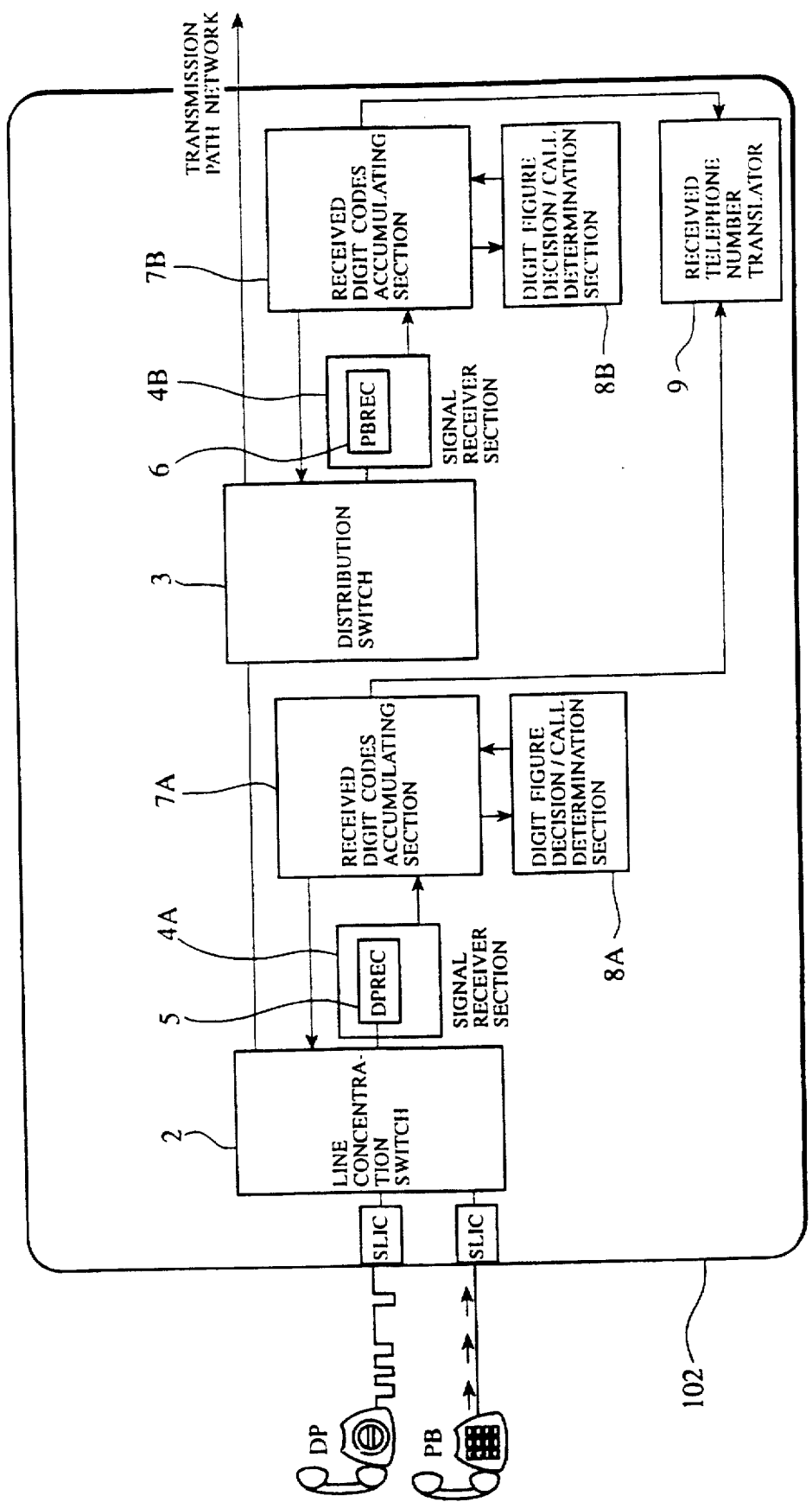
FIG. 10 is a block diagram showing the configuration according to the second embodiment of the call selecting apparatus of the present invention.

FIG. 10 is a diagram for explaining the second embodiment of the present invention and which shows a call selecting apparatus 102 being an exchange comprising, in accordance with the present invention, a line concentration switch 2, a DPREC 5, a PBREC 6, received digit codes accumulating sections 7A and 7B, a distribution switch 3, digit figure decision/call determination sections 8A and 8B as means for deciding figure of digit codes received and for discriminating an emergency message call, and a received telephone number translator 9.

The characteristic feature of the present embodiment is in such configuration that the DPREC 5 is directly connected to the line concentration switch 2, the PBREC 6 is directly connected to the distribution switch 3, the received digit codes accumulating sections 7A and 7B are disposed immediately after the DPREC 5 and the PBREC 6, respectively, and the digit figure decision/call determination sections 8A and 8B which execute a table search for determining whether a called telephone number corresponds to the one relating to emergency message calls or not and another table search for effecting pre-translation as an integral operation are mounted.

In also the present embodiment, it is not reported to the main body processor in every occasions of one digit codes reception, but the results of digit figure decision and determination of emergency message call as well as the whole digit codes received are collectively reported to the main body processor.

Furthermore, the present embodiment has also a configuration wherein a device for practicing a table search for the determination of an emergency message call and the decision of a digit figure in accordance with a parallel searching manner is provided.

In the call selecting apparatus 102 of the present embodiment, a first signal receiver section 4A composed of the DPREC 5, the first received digit codes accumulating section 7A corresponding to the first signal receiver section, and the first digit figure decision/call determination section 8A are provided on the line concentration switch 2 side in addition to the line concentration switch 2 and the distribution switch 3 being the same as those in Embodiment 1, and further a second signal receiver section 4B composed of the PBREC 6, the second received digit codes accumulating section 7B corresponding to the second signal receiver section 4B, and the second digit figure decision/call determination section 8B are provided on the distribution switch 3 side, besides the received telephone number translator 9 is provided.

Figure 11:
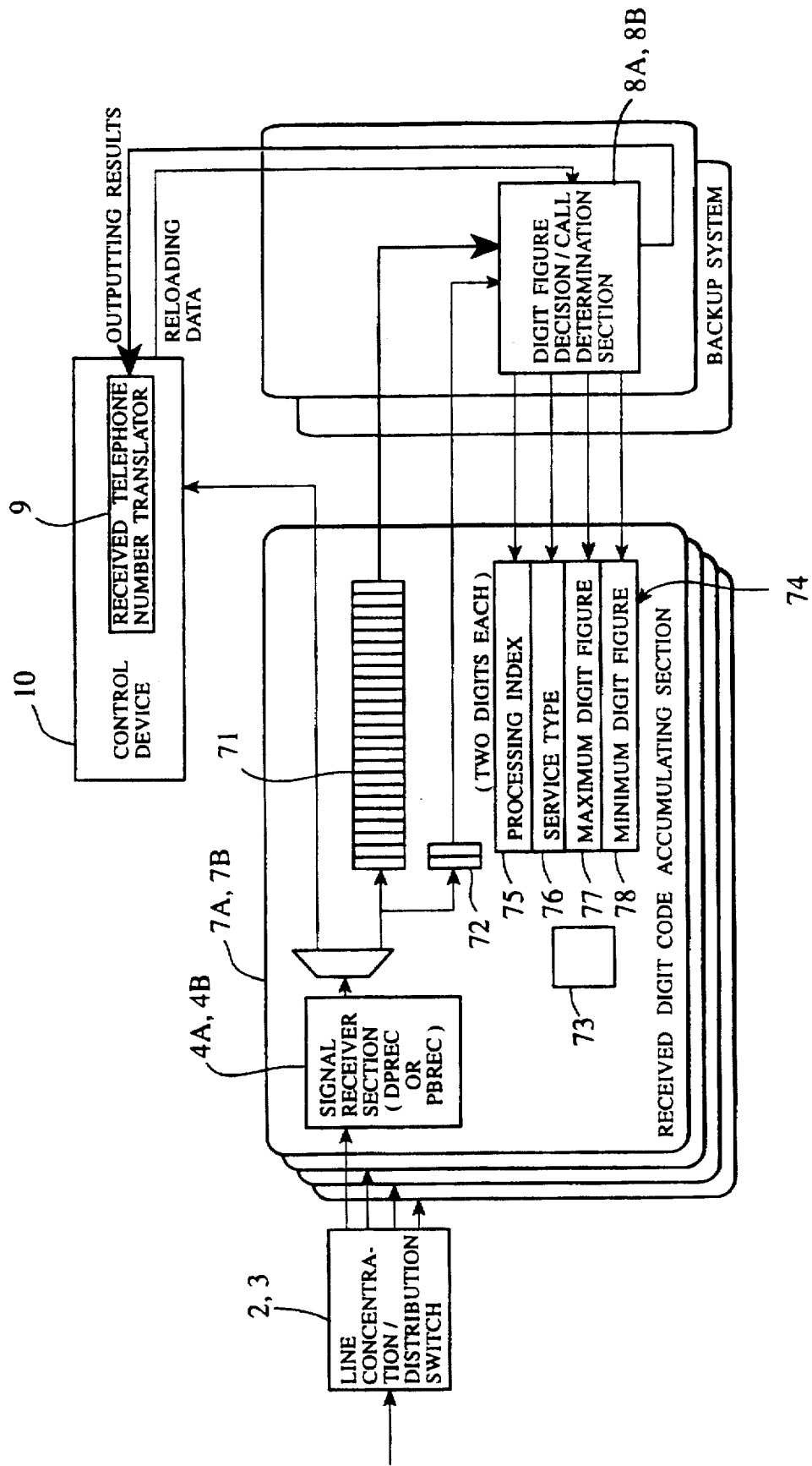
FIG. 11 is a conceptional diagram showing the received digit codes accumulating section according to the second embodiment of the present invention.

FIG. 11 is a conceptional diagram showing the first and the second received digit codes accumulating sections 7A and 7B wherein they are composed of a device (71) for accumulating digit codes received in each of the corresponding DPREC 5 and the PBREC 6, a device (72) for storing the figure of the present received digit codes, a device (75) for storing a processing index indicating whether the decision of a digit figure is possible or not on the basis of the digit codes at the moment, a device (77) for storing the minimum digit figure to be received and a device (78) for storing the maximum digit figure to be received in the case when the digit figure was decided, and a device (76) for storing service types, respectively.

The first and the second received digit codes accumulating sections 7A and 7B have similar configurations to each other in which there is an only difference in that either of the received digit codes accumulating sections is connected to either the DPREC 5 or the PBREC 6, and further these sections have the same constitution as that of the received digit codes accumulating section 7 shown in FIG. 4.

Figure 12:
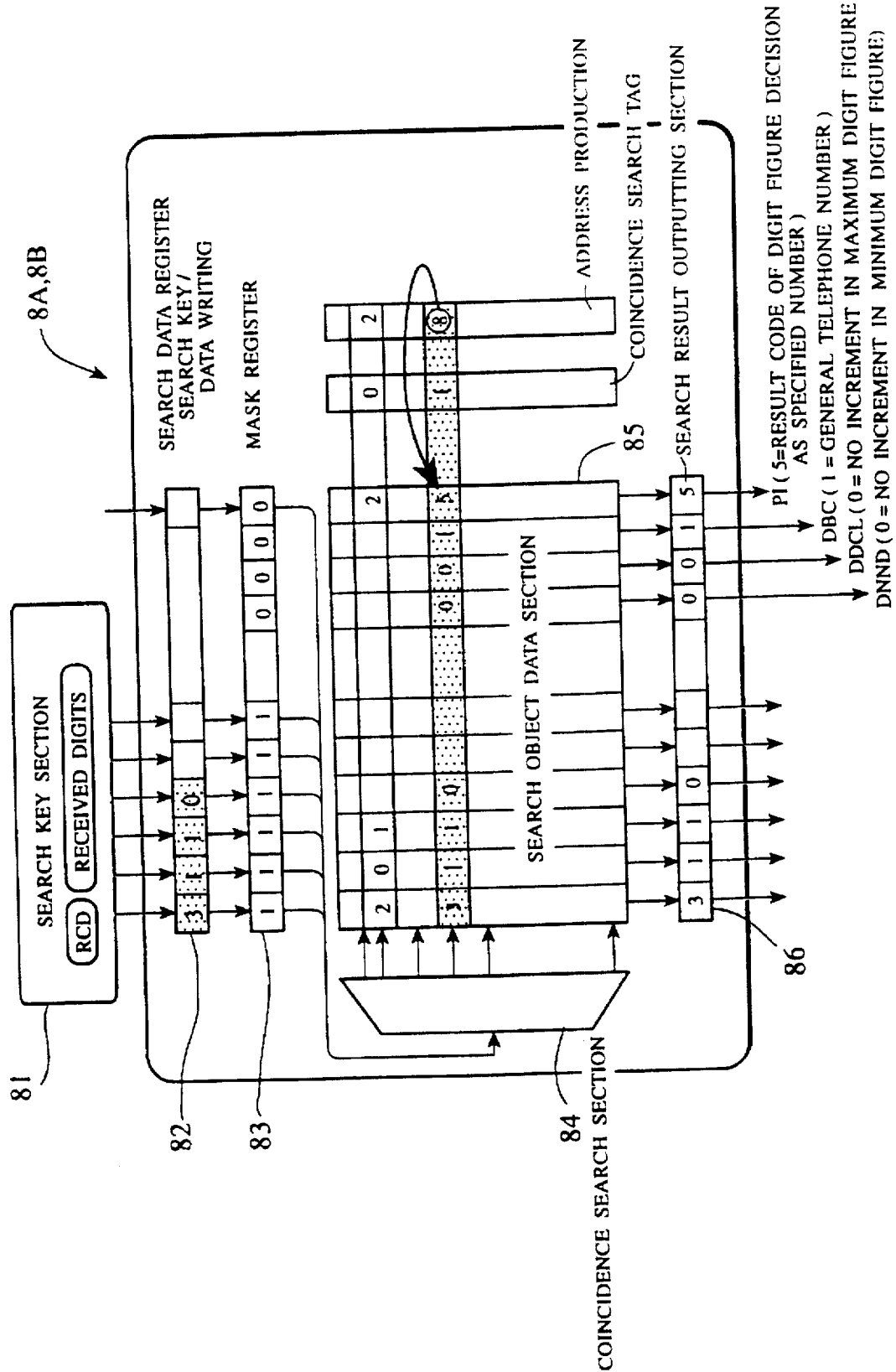
FIG. 12 is a conceptional diagram showing the digit figure decision/call determination section according to the second embodiment of the present invention.

FIG. 12 is a conceptional diagram showing the first and the second digit figure decision/call determination sections 8A and 8B wherein they are composed of a search key section 81, a search object data section 85, a coincidence search section 84, and a search result outputting section 86, respectively.

The first digit figure decision/call determination section 8A has the same configuration as that of the second digit figure decision/call determination section 8B, and further these digit figure decision/call determination sections 8A and 8B have the same configurations as that of the digit figure decision/call determination section 8 shown in FIG. 5.

Operations of the embodiment of the present invention will be described hereinbelow.

When a subscriber intends to dial on pulse type terminal, the subscriber's line is connected to the DPREC 5 through the line concentration switch 2. The dial signals sent by the subscriber are received in the DPEEC 5, and one digit code received is accumulated in the received digit code accumulating section 7A, so that the value of the figure of present received digit codes which has been stored in the received digit codes accumulating section 7A increases by "one".

On the other hand, when a subscriber intends to dial on DTMF type terminal, the subscriber's line is connected to the PBREC 6 through the line concentration switch 2 and the distribution switch 3. The dial signals sent by the subscriber are received in the PBREC 6, and one digit code received is accumulated in the received digit codes accumulating section 7B, so that the value of the figure being the present received digit codes which has been stored in the received digit codes accumulating section 7B increases by "one".

The digit figure decision/call determination sections 8A and 8B read out periodically the received digit codes and the present digit figure of the received digit codes in the received digit codes accumulating sections 7A and 7B, respectively, such determination whether or not the figure of the digit code accomplished is decided on the basis of the digit codes until the present time and such determination whether or not a call is an emergency message call are carried out by one table search, the results obtained are outputted to the search result outputting section 86, and the results are written in the processing index section 75, the received minimum digit figure section 78, the received maximum digit figure section 77, and the service type section 76, of the digit codes accumulating section 74, respectively.

For the sake of executing asynchronously and parallelly the accumulation processing of received digit codes with and to the operations of the digit figure decision/call determination sections 8A and 8B, it is desirable that a cycle for the read-out and the determination is set sufficiently shorter than (the minimum cycle of digit codes received)/(the number of places stored in the digit codes accumulating section).

Until the decision what the figure of the digit code is at accomplishment of a telephone number and the determination whether a call is an emergency message call or not are completed, the periodic read-out from the received digit codes accumulating section and the determination are repeated by means of the above described digit figure decision/call determination sections. After completing the digit figure decision and the determination whether or not a call is an emergency message call, and either the case when the present digit figure of received digit codes became equal to the maximum digit figure obtained by the digit figure decision or the case when a interval time between the digits codes themselves exceeded a timer value between the digits after the present figure of digit codes received exceeded the minimum digit figure obtained by the digit figure decision, all the digit codes received up to that time are collectively delivered to the main body processor (control device 10). The delivery is carried out from the received digit codes accumulating sections 7A and 7B to the control device 10 in accordance with the same way as that of the first embodiment in a manner such that the result of determination whether or not a call corresponds to an emergency message call and the like results are added to all the digit codes received and the received digit figure.

A transfer of digit codes received from a peripheral circuit to the exchange main body processor (control device 10) is carried out in accordance with the same manner as that shown in FIG. 6.

After all the digit codes decided by digit figure decision were collectively delivered, the peripheral circuit makes the present figure of digit codes received in the corresponding received digit codes accumulating sections 7A and 7B to be 0, respectively, and initializes the processing index section 75, the received minimum digit figure section 78, the received maximum digit figure section 77, and the service type section 78, of the digit codes accumulating section 74, respectively, whereby a preliminary arrangement for the following digit codes reception is carried out.

On the other hand, the exchange main body processor (control device 10) or the call processing software executes preferential connection processing, if a call corresponds to an emergency message call on the basis of the determined result added.

It is to be noted that a manner for reloading the data in the search object data section 85 is the same as that in the first embodiment.

Furthermore, in the present embodiment, although the DPREC 5 is disposed at the succeeding stage of the line concentration switch 2 as in the first embodiment, the PBREC 6 is disposed at the succeeding stage of the distribution switch 3. According to such configuration as described above, the cost efficiency is improved. This is because the line concentration switch 2 collects from around several thousands to several ten thousands of SLIC required by the number corresponding to that of the subscriber's lines, besides the distribution switch 3 contains around from twenty to forty line concentration switches 2, so that when signal receivers and the other mechanisms are disposed at the succeeding stage of the distribution switch 3 rather than that of the line concentration switch 2, the total number of wiring decreases. It is to be noted that DP means a manner for counting pulses with respect to constant voltage, and which is the one detected in a subscriber's circuit (SLIC), so that the DPREC 5 is required to position in the vicinity of the subscriber's circuit. On the other hand, since DTMF is an aural signal, the termination of the signal may be not only at the succeeding stage of the line concentration switch 2, but also at that of the distribution switch 3, besides the same may be in another exchange.

In accordance with such configuration as described above, pre-translation mechanisms are disposed on both the sides of the line concentration switch 2 and the distribution switch 3, so that the side of line concentration switch 2 and the side of distribution switch 3 may be arranged to be separate systems, respectively. Moreover, the present embodiment is suitably adaptable to a conventional exchange. Because the PBREC 6 is usually placed at the succeeding stage of the distribution switch 3 in a conventional exchange.

While an emergency message call with respect to police, fire and the like stations has been described also in the present embodiment, a call is not limited to that described above, it may be mass callings such as telephonic voting, broadcasting by announcement machine, and the like.

Embodiment 3

Figure 13:
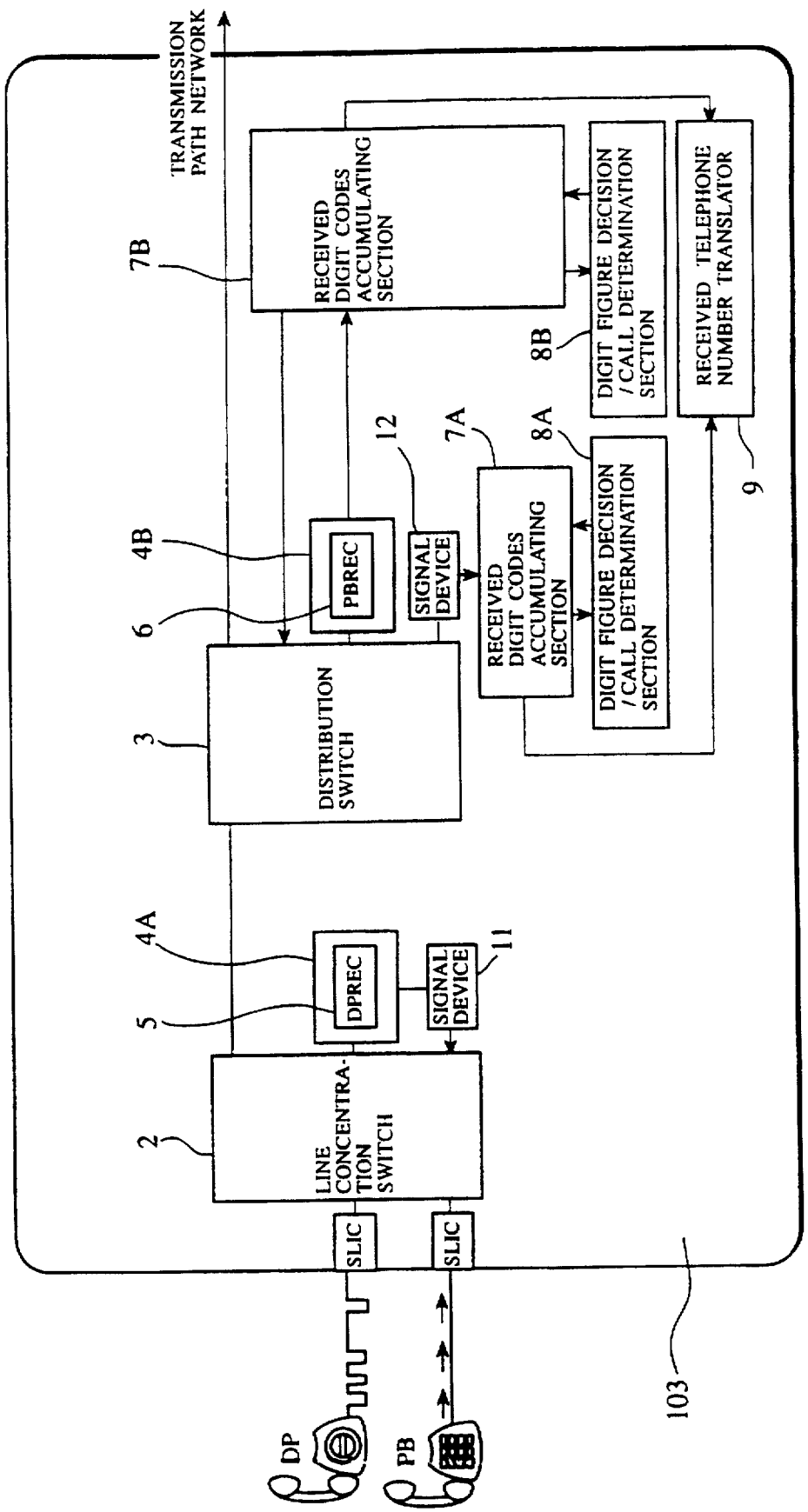
FIG. 13 is a block diagram showing the configuration according to the third embodiment of the call selecting apparatus of the present invention.

FIG. 13 is a diagram for explaining the third embodiment of the present invention and which shows a call selecting apparatus 103 being an exchange comprising, in accordance with the present invention, a line concentration switch 2, a DPREC 5, a PBREC 6, received digit codes accumulating sections 7A and 7B, a distribution switch 3, signal devices 11 and 12 for transmitting and receiving signals derived from digit codes received by the DPREC 5, digit figure decision/call determination sections 8A and 8B as means for deciding received digit figure and discriminating emergency message calls, and a received telephone number translator 9.

The characteristic feature of the present embodiment is in such configuration that the DPREC 5 which receives dial numbers from a pulse type telephone is directly connected to the line concentration switch 2, digit codes received by the DPREC 5 are transmitted to the signal device 12 connected to the distribution switch 3 through the signal device 11 in, for example, a frame form or a bus form, the received digit codes accumulating section 7A is disposed immediately after the signal device 12, and the digit figure decision/call determination section 8A which executes a table search for determining whether a called number corresponds to the one relating to emergency message calls or not and a table search for effecting pre-translation as an integral operation is mounted.

Further, the characteristic feature of the present embodiment is also in such configuration that the PBREC 6 which receives dial numbers from a DTMF type telephone is directly connected to the distribution switch 3, the received digit codes accumulating section 7B which is separately mounted from the one used for the DPREC 5 is disposed immediately after the PBREC 6, and the digit figure decision/call determination section 8B which executes a table search for determining whether s called number corresponds to the one relating to emergency message calls or not and a table search for effecting pre-translation as an integral operation is mounted.

In also the present embodiment, it is not reported to the main body processor in every occasions of one digit code reception, but the results of digit figure decision and determination of emergency message call as well as the whole digit codes received are collectively reported to the main body processor.

Furthermore, the present embodiment has also a configuration wherein a device for practicing a table search for the determination of an emergency message call and the decision of a digit figure in accordance with a parallel searching manner is provided.

In the call selecting apparatus 103 of the present embodiment, a first signal receiver section 4A composed of the DPREC 5, and the first signal device 11 at the preceding stage corresponding to the first signal receiver section are provided on the line concentration switch 2 side in addition to the line concentration switch 2 and the distribution switch 3 being the same as those in embodiment 1, then the signal device 12 at the succeeding stage which receives signals from the signal device 11 at the preceding stage, the first received digit codes accumulating section 7A corresponding to the signal device 12, and the first digit figure decision/call determination section 8A are provided on the distribution switch 3 side, and further a second signal receiver section 4B composed of the PBREC 6, the second received digit codes accumulating section 7B corresponding to the second signal receiver section 4B, and the second digit figure decision/call determination section 8B are provided on the distribution switch 3 side, besides the received telephone number translator 9 is mounted.

Figure 14:
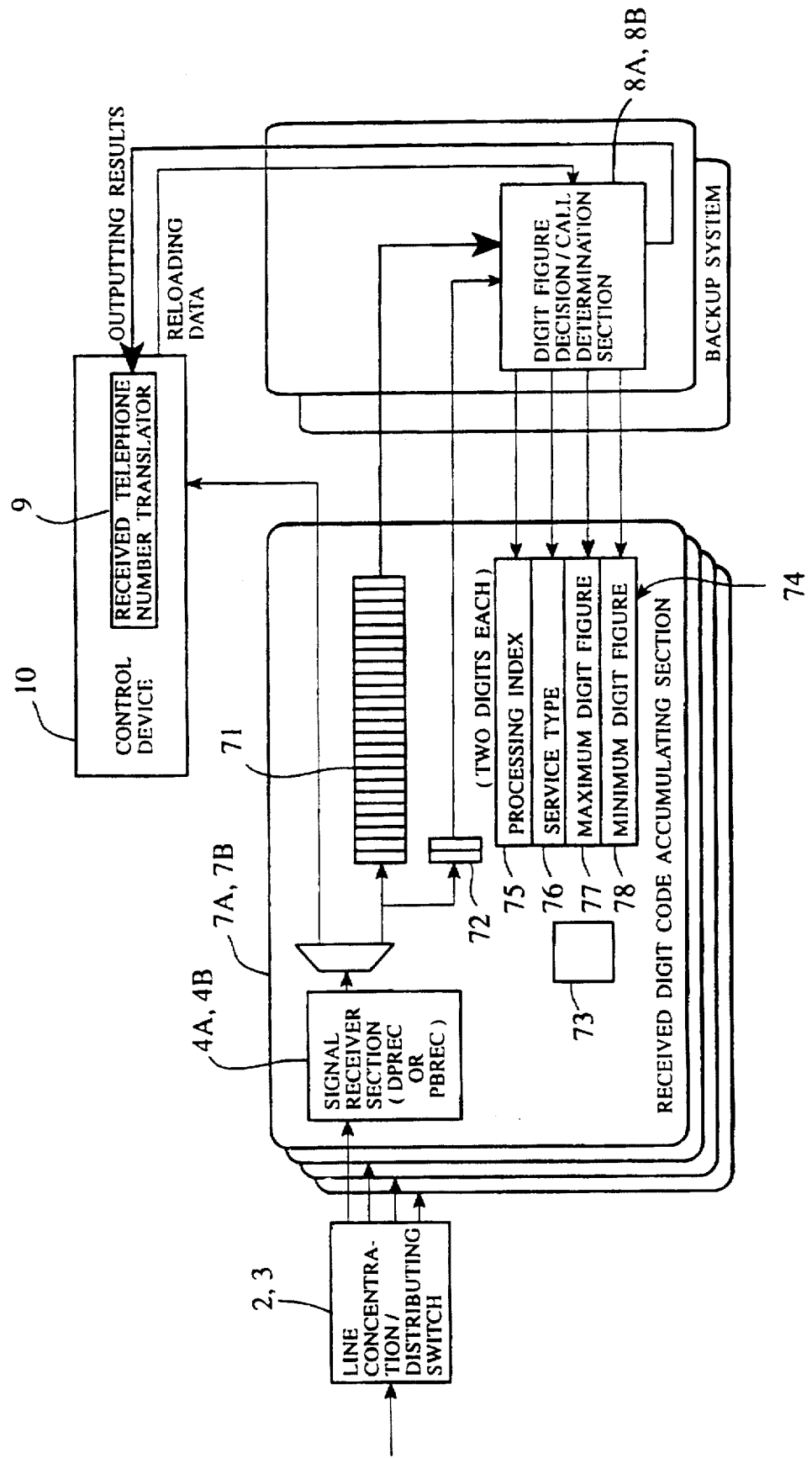
FIG. 14 is a conceptional diagram showing the received digit codes accumulating section according to the third embodiment of the present invention.

FIG. 14 is a conceptional diagram showing the first and the second received digit codes accumulating sections 7A and 7B wherein they are composed of a device (71) for accumulating digit codes received in each of the corresponding DPREC 5 and PBREC 6, a device (72) for storing the figure of the present received digit codes, a device (75) for storing a processing index indicating whether the decision of a digit figure is possible or not on the basis of the digit codes received at the moment, a device (77) for storing the minimum digit figure to be received and a device (78) for storing the maximum digit figure to be received in the case when the digit figure was decided, and a device (76) for storing service types, respectively.

The first and the second received digit codes accumulating sections 7A and 7B have similar configurations to each other in which there is an only difference in that either of the received digit codes accumulating sections is connected to either the signal device 12 or the PBREC 6, and further these sections have the same constitution as that of the received digit codes accumulating section 7 shown in FIG. 4.

Figure 15:
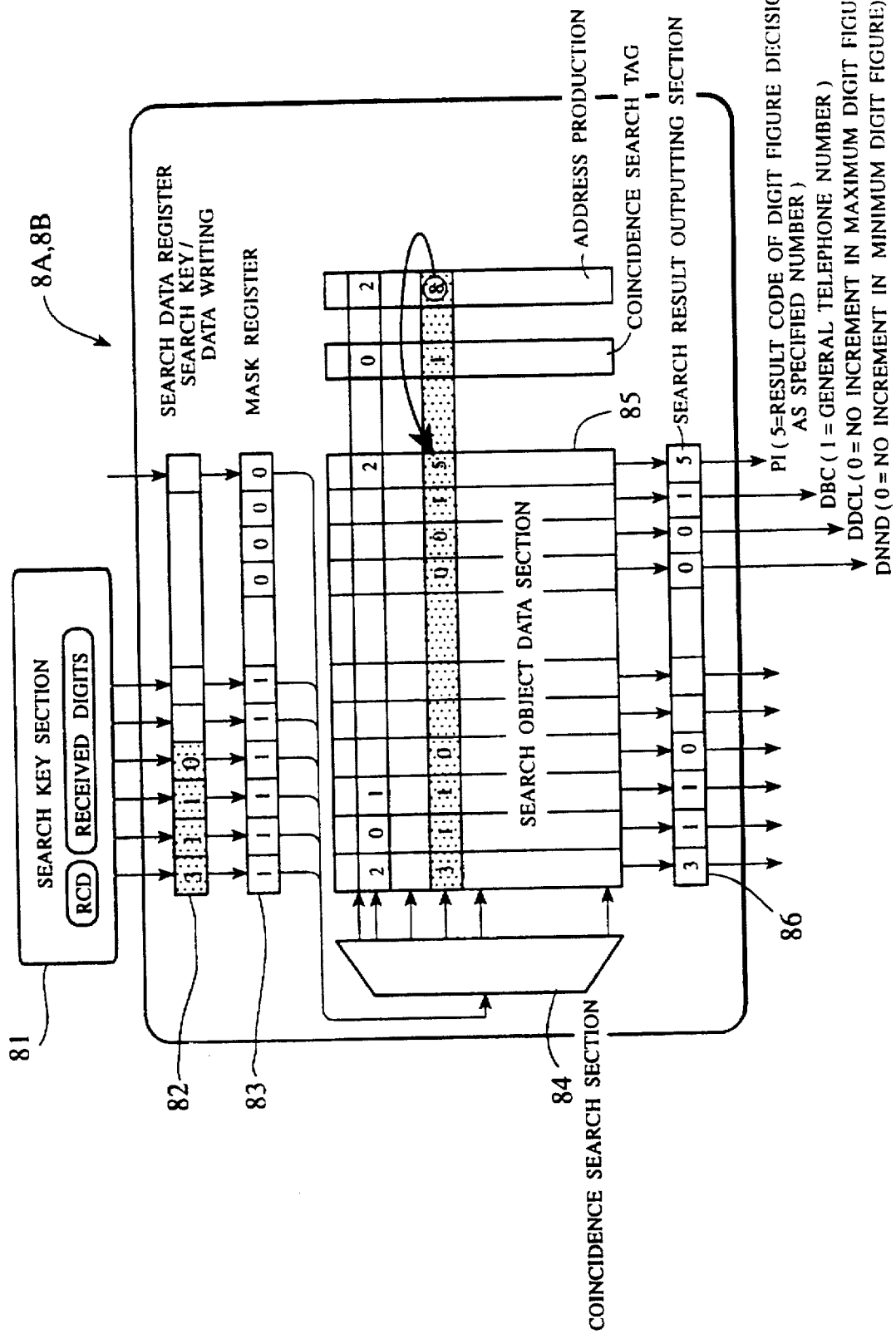
FIG. 15 is a conceptional diagram showing the digit figure decision/call determination section according to the third embodiment of the present invention.

FIG. 15 is a conceptional diagram showing the first and the second digit figure decision/call determination sections 8A and 8B wherein they are composed of a search key section 81, a search object data section 85, a coincidence search section 84, and a search result outputting section 86, respectively.

The first digit figure decision/call determination section 8A has the same configuration as that of the second digit figure decision/call determination section 8B, and further these digit figure decision/call determination sections 8A and 8B have the same configurations as that of the digit figure decision/call determination section 8 shown in FIG. 5.

Operations of the embodiment of the present invention will be described hereinbelow.

When a subscriber intends to dial on a pulse type terminal, the subscriber's line is connected to the DPREC 5 through the line concentration switch 2. The dial signals sent by the subscriber are received in the DPREC 5, the digit codes received are modified into, for example, a frame form or a bus form by means of the signal device 11, and received by the signal device 12 via the distribution switch 3. To the signal device 12 is connected the received digit codes accumulating section 7A, and one digit code received is accumulated therein, whereby the value of the present digit figure of digit codes received increases by "one".

On the other hand, when a subscriber intends to dial on a DTMF type terminal, the subscriber's line is connected to the PBREC 6 through the line concentration switch 2 and the distribution switch 3. The dial signals sent by the subscriber are received in the PBREC 6. To the PBREC 6 is connected the received digit codes accumulating section 7B, one digit code received is accumulated therein, and at the same time the value of the present digit figure of digit codes received increases by "one".

The digit figure decision/call determination sections 8A and 8B are connected to the received digit codes accumulating sections 7A and 7B which are connected to the DPREC 5 and the PBREC 6, respectively. The digit figure decision/call determination sections 8A and 8B read out periodically the received digit codes and the present digit figure of the received digit codes in the received digit codes accumulating sections 7A and 7B, respectively, such determination whether or not the figure of the digit code accomplished is decided on the basis of the number dialed at the present time and such determination whether or not a call is an emergency message call are carried out by one table search, the results obtained are outputted to the search result outputting section 86, and the results are written in the processing index section 75, the received minimum digit figure section 78, the received maximum digit figure section 77, and the service type section 76, of the digit codes accumulating section 74, respectively.

For the sake of executing asynchronously and parallelly the accumulation processing of received digit codes with and to the operations of the digit figure decision/call determination sections 8A and 8B, it is desirable that a cycle for the read-out and the determination is set sufficiently shorter than (the minimum cycle of digit codes received)/(the number of places stored in the digit codes accumulating section).

Until the decision what the figure of the digit codes is at accomplishment of a telephone number and the determination whether a call is an emergency message call or not are completed, the periodic read-out from the received digit codes accumulating sections 7A and 7B and the determination are repeated by means of the above described digit figure decision/call determination sections 8A and 8B.

After completing the digit figure decision and the determination whether or not a call is an emergency message call, and either when the present digit figure of received digit codes became equal to the maximum digit figure obtained by the digit figure decision or when a interval time between digit codes themselves exceeded a timer value between the digits after the present figure of digit codes received exceeded the minimum digit figure obtained by the digit figure decision, all the digit codes received up to that time are collectively delivered to the main body processor (control device 10). The delivery is carried out from the received digit codes accumulating sections 7A and 7B to the control device 10 in accordance with the same way as that of the first embodiment in a manner such that the result of determination whether or not a call corresponds to an emergency message call and the like results are added to all the digit codes received and the received digit figure.

A transfer of digit codes received from a peripheral circuit to the exchange main body processor (control device 10) is carried out in accordance with the same manner as that shown in FIG. 6.

After all the digit codes decided by digit figure decision were collectively delivered, the peripheral circuit makes the present figure of digit codes received in the corresponding received digit codes accumulating sections 7A and 7B to be 0, respectively, and initializes the processing index section 75, the received minimum digit figure section 78, the received maximum digit figure section 77, and the service type section 78, of the digit codes accumulating section 74, respectively, whereby a preliminary arrangement for the following digit codes reception is carried out.

On the other hand, the exchange main body processor (control device 10) or the call processing software executes preferential connection processing, if a call corresponds to an emergency message call on the basis of the determined result added.

It is to be noted that a manner for reloading the data in the search object data section 85 is the same as that in the first embodiment.

Furthermore, in also the present embodiment, the PBREC 6 is disposed at the succeeding stage of the distribution switch 3 as in the second embodiment, whereby the cost efficiency is improved. Accordingly, the present embodiment is suitably adaptable to a conventional exchange. In the present embodiment, however, it is arranged in such that a pre-translation mechanism is placed only on the side of the distribution switch 3, and from the side of the line concentration switch 2 digit codes are transferred through the signal device 11. The signals relating to the digit codes transferred from the side of the line concentration switch 2 are inputted to the signal device 12 on the side of the distribution switch 3, and then delivered to dedicated pre-translation mechanisms (7A and 8A). The present embodiment has such a simple configuration that it is sufficient to provide the pre-translation mechanisms for DP use and DTMF use in each distribution switch 3. Therefore, according to the present embodiment, it is sufficient in use of a conventional exchange to adopt few engineering changes with respect to the exchange. Moreover, such configuration exhibits an advantageous mode in the case where an improvement in only DTMF is allowed to precede, and the configuration is permitted to respond to DP later. Furthermore, the configuration is advantageous in the case where the pre-translation mechanism for DP use cannot combine with the pre-translation mechanism for PB use due to the restriction of a constitutional point of view in respect of the system as in the manner illustrated in FIG. 6.

In also the present embodiment, a call is not limited to emergency message calls, it may be mass callings such as telephonic voting, broadcasting by an announcement machine, and the like.

Embodiment 4

Figure 16:
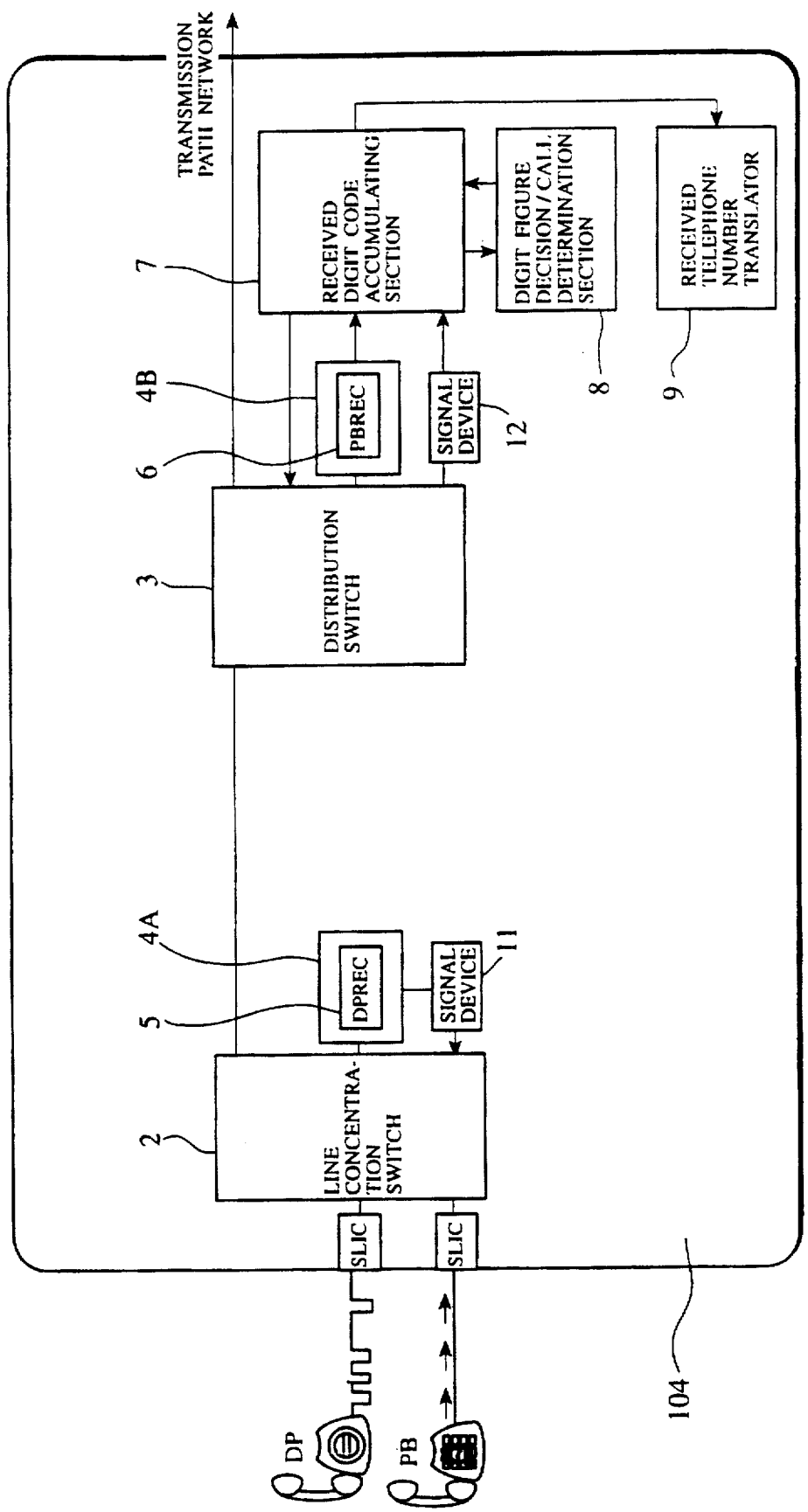
FIG. 16 is a block diagram showing the configuration according to the fourth embodiment of the call selecting apparatus of the present invention.

FIG. 16 is a diagram for explaining the fourth embodiment of the present invention and which shows a call selecting apparatus 104 being an exchange comprising, in accordance with the present invention, a line concentration switch 2, a DPREC 5, a PBREC 6, a received digit codes accumulating section 7, a distribution switch 3, a signal device 11 for transmitting and receiving signals derived from digit codes received by the DPREC 5, a digit figure decision/call determination sections 8 as a means for deciding received digit figure and discriminating emergency message calls, and a received telephone number translator 9.

The characteristic feature of the present embodiment is in such configuration that the DPREC 5 which receives dial numbers from a pulse type telephone is directly connected to the line concentration switch 2, digit codes received by the DPREC 5 are transmitted to the signal device 12 connected to the distribution switch 3 through the signal device 11 in, for example, a frame form or a bus form, the received digit codes accumulating section 7 is disposed immediately after the signal device 12, and the digit figure decision/call determination section 8 which executes a table search for determining whether a called number corresponds to the one relating to emergency message calls or not and a table search for effecting pre-translation as an integral operation is mounted.

Furthermore, the characteristic feature of the present embodiment is also in such configuration that the PBREC 6 which receives dial numbers from a DTMF type telephone is directly connected to the distribution switch 3, the received digit codes accumulating section 7 which is commonly used with the DPREC 5 is disposed immediately after the PBREC 6, and the digit figure decision/call determination section 8 which executes a table search for determining whether a called number corresponds to the one relating to emergency message calls or not and a table search for effecting pre-translation as an integral operation is mounted.

In also the present embodiment, the digit codes accumulating section which accumulates the digit codes from the PBREC 6 is held in common with the digit codes accumulating section which accumulates the digit codes delivered from the DPREC 5 through the signal device, whereby it is not reported to the main body processor in every occasions of one digit code reception, but the results of digit figure decision and determination of emergency message call as well as the whole digit codes received are collectively reported to the main body processor.

Furthermore, the present embodiment has also a configuration wherein a device for practicing a table search for the determination of an emergency message call and the decision of a digit figure in accordance with a parallel searching manner is provided.

In the call selecting apparatus 104 of the present embodiment, a first signal receiver section 4A composed of the DPREC 5, and the first signal device 11 at the preceding stage corresponding to the first signal receiver section are provided on the line concentration switch 2 side in addition to the line concentration switch 2 and the distribution switch 3 being the same as those in embodiment 1, then the signal device 12 at the succeeding stage which receives signals from the signal device 11 at the preceding stage is provided on the distribution switch 3 side, and further a second signal receiver section 4B composed of the PBREC 6, the received digit codes accumulating section 7 corresponding to the second signal receiver section 4B as well as to the signal device 12 at the succeeding stage, and the digit figure decision/call determination section 8 are provided on the distribution switch 3 side, besides the received telephone number translator 9 is mounted.

Figure 17:
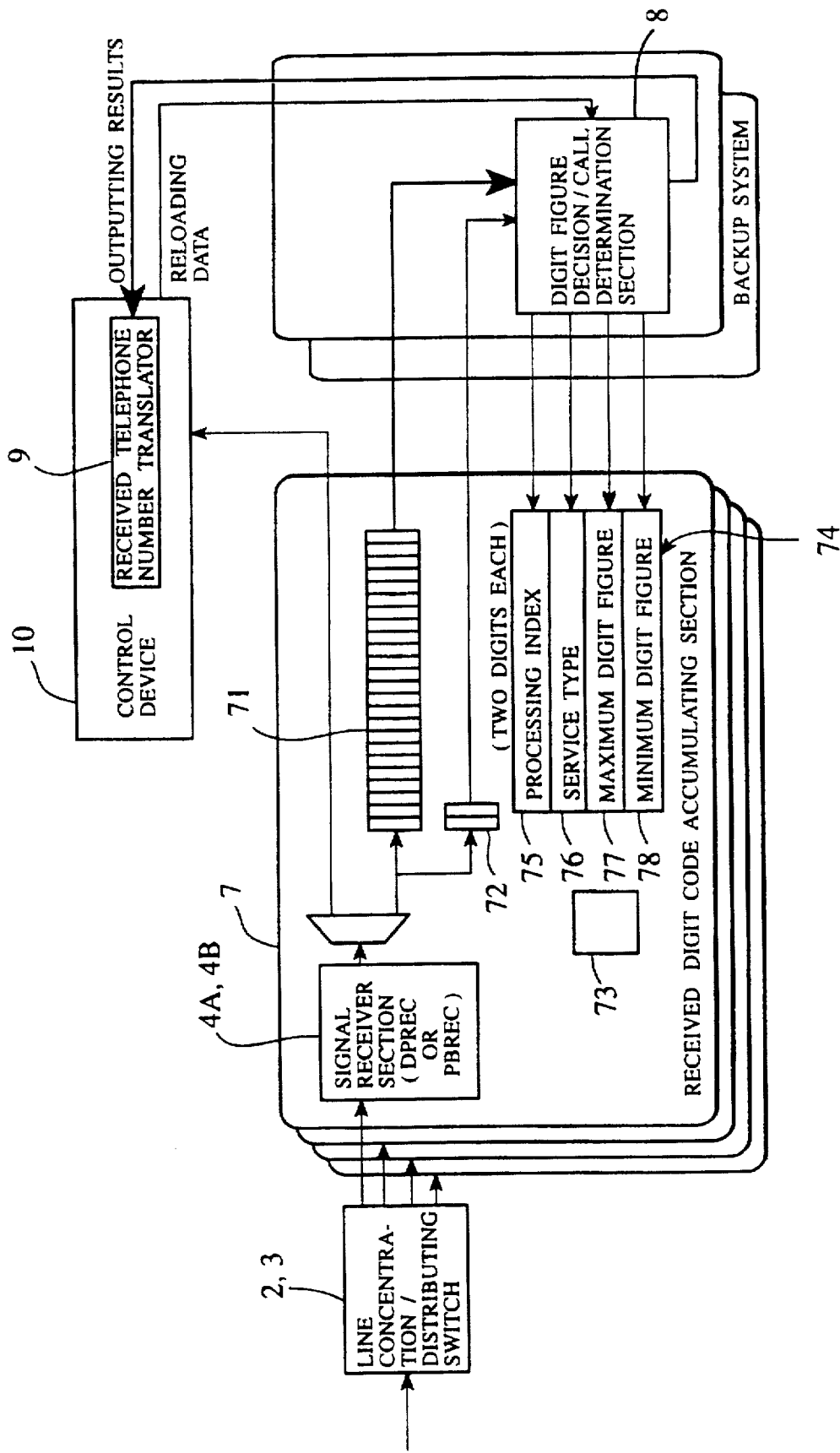
FIG. 17 is a conceptional diagram showing the received digit codes accumulating section according to the fourth embodiment of the present invention.

FIG. 17 is a conceptional diagram showing the received digit codes accumulating section 7 wherein the section 7 is composed of a device (71) for accumulating digit codes received in each of the corresponding DPREC 5 and PBREC 6, a device (72) for storing the figure of the present received digit codes, a device (75) for storing a processing index indicating whether the decision of a digit figure is possible or not on the basis of the digit codes received at the moment, a device (77) for storing the minimum digit figure to be received and a device (78) for storing the maximum digit figure to be received in the case when the digit figure was decided, and a device (78) for storing service types, respectively.

The received digit codes accumulating section 7 has the same constitution as that of the received digit codes accumulating section 7 shown in FIG. 4.

Figure 18:
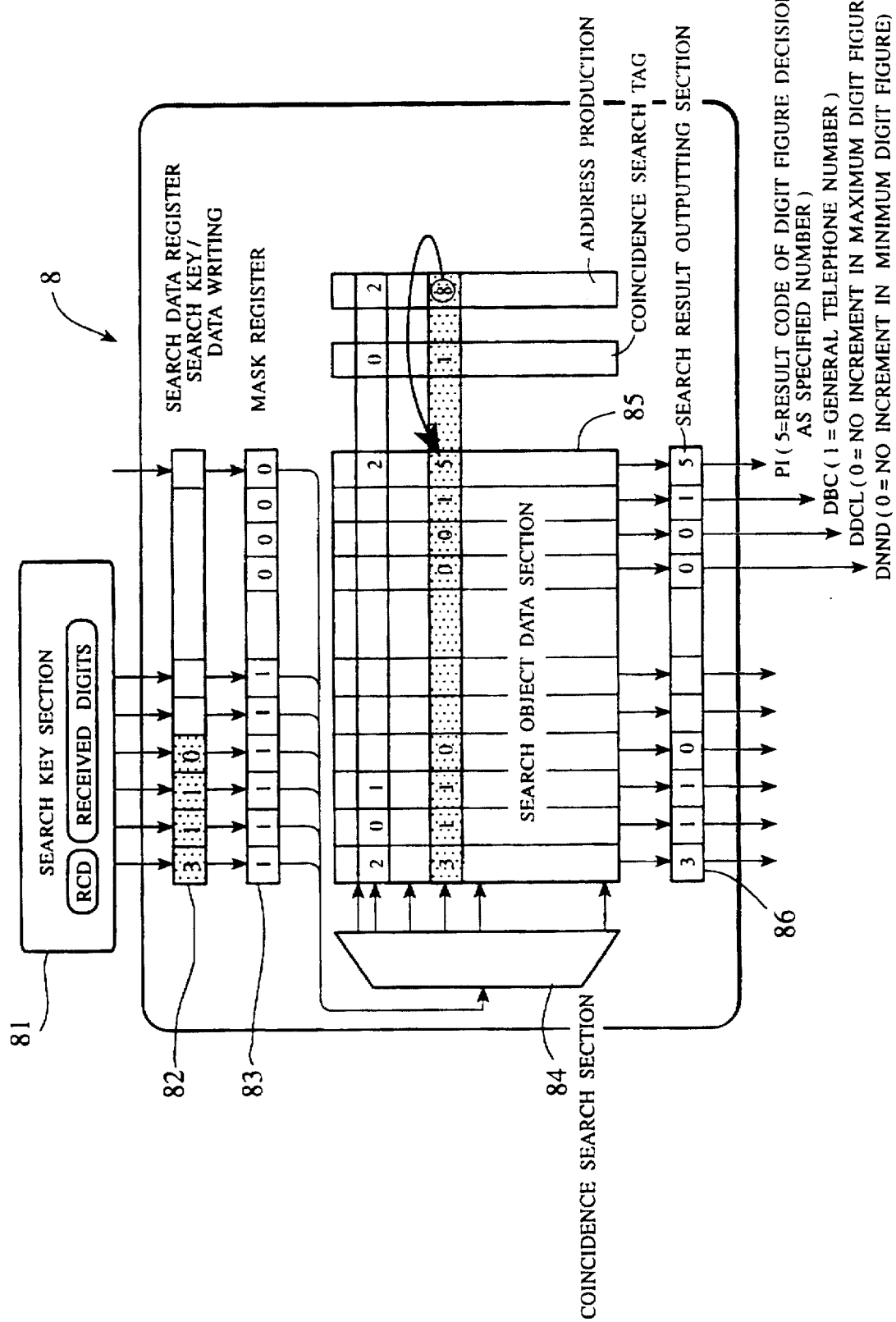
FIG. 18 is a conceptional diagram showing the digit figure decision/call determination section according to the fourth embodiment of the present invention.

FIG. 18 is a conceptional diagram showing the digit figure decision/call determination section 8 wherein the section 8 is composed of a search key section 81, a search object data section 85, a coincidence search section 84, and a search result output ting section 88, respectively.

The decision/call determination section 8 has the same configuration as that of the digit figure decision/call determination section 8 shown in FIG. 5.

Operations of the embodiment of the present invention will be described hereinbelow.

When a subscriber intends to dial on a pulse type terminal, the subscriber's line is connected to the DPREC 5 through the line concentration switch 2. The dial signals sent by the subscriber are received in the DPREC 5, the digit codes received are modified into, for example, a frame form or a bus form by means of the signal device 11, and received by the signal device 12 via the distribution switch 3. To the signal device 12 is connected the received digit codes accumulating section 7, and one digit code received is accumulated therein, whereby the value of the present digit figure of digit codes received increases by "one".

When a subscriber intends to dial on a DTMF type terminal, the subscriber's line is connected to the PBREC 6 through the line concentration switch 2 and the distribution switch 3. The dial signals sent by the subscriber are received in the PBREC 6. To the PBREC 6 is connected the received digit codes accumulating section 7, one digit code received is accumulated therein, and at the same time the value of the present digit figure of digit codes received increases by "one".

The digit figure decision/call determination section 8 is connected to the received digit codes accumulating section 7 which is connected to the DPREC 5 and the PBREC 6, respectively. The digit figure decision/call determination section 8 reads out periodically the received digit codes and the present digit figure of the received digit codes in the received digit codes accumulating section 7, such determination whether or not the figure of the digit code accomplished is decided on the basis of the telephone number dialed at the present time and such determination whether or not a call is an emergency message call are carried out by one table search, the results obtained are outputted to the search result output ting section 86, and the results are written in the processing index section 75, the received minimum digit figure section 78, the received maximum digit figure section 77, and the service type section 76, of the digit codes accumulating section 74, respectively.

For the sake of executing asynchronously and parallelly the accumulation processing of received digit codes with and to the operations of the digit figure decision/call determination section 8, it is desirable that a cycle for the read-out and the determination is set sufficiently shorter than (the minimum cycle of digit codes received)/(the number of places stored in the digit codes accumulating section).

Until the decision what the figure of the digit codes is at accomplishment of a telephone number and the determination whether a call is an emergency message call or not are completed, the periodic read-out from the received digit codes accumulating section 7 and the determination are repeated by means of the above described digit figure decision/call determination section 8.

After completing the digit figure decision and the determination whether or not a call is an emergency message call, and either when the present digit figure of received digit codes became equal to the maximum digit figure obtained by the digit figure decision or when a interval time between digit codes themselves exceeded a timer value between the digits after the present figure of digit codes received exceeded the minimum digit figure obtained by the digit figure decision, all the digit codes received up to that time are collectively delivered to the main body processor (control device 10). The delivery is carried out from the received digit codes accumulating section 7 to the control device 10 in accordance with the same way as that of the first embodiment in a manner such that the result of determination whether or not a call corresponds to an emergency message call and the like results are added to all the digit codes received and the received digit figure.

A transfer of digit codes received from a peripheral circuit to the exchange main body processor (control device 10) is carried out in accordance with the same manner as that shown in FIG. 6.

After all the digit codes decided by digit figure decision were collectively delivered, the peripheral circuit makes the present figure of digit codes received in the corresponding received digit codes accumulating section 7 to be 0, and initializes the processing index section 75, the received minimum digit figure section 78, the received maximum digit figure section 77, and the service type section 76, of the digit codes accumulating section 74, respectively, whereby a preliminary arrangement for the following digit codes reception is carried out.

On the other hand, the exchange main body processor (control device 10) or the call processing software executes preferential connection processing, if a call corresponds to an emergency message call.

It is to be noted that a manner for reloading the data in the search object data section 85 is the same as that in the first embodiment.

Furthermore, in also the present embodiment, the PBREC 6 is disposed at the succeeding stage of the distribution switch 3 as in the second and the third embodiments, whereby the cost efficiency is improved. Accordingly, the present embodiment is suitably adaptable to a conventional exchange. In the present embodiment, it is arranged in such that a pre-translation mechanism is placed only on the side of the distribution switch 3, and from the side of the line concentration switch 2 digit codes are transferred through the signal device 11 as in the third embodiment. The signals relating to the digit codes transferred from the side of the line concentration switch 2 are inputted to the signal device 12 on the side of the distribution switch 3. However, the following procedure differs from that of the third embodiment, i.e. the signals are delivered to the same pre-translation mechanisms (7 and 8). The present embodiment has such a simple configuration that it is sufficient to provide the pre-translation mechanisms in each distribution switch 3. Therefore, according to the present embodiment, it is sufficient in use a conventional exchange to adopt few engineering changes with respect to the exchange. On one hand, in the present embodiment, since the DPREC 5 and the PBREC 6 can provide the same interface with respect to the translation mechanisms as in the first embodiment, it is advantageous in view of a software constitution.

In also the present embodiment, a call is not limited to emergency message calls, it may be mass callings such as telephonic voting, broadcasting by an announcement machine, and the like.

The present invention has been explained in detail as stated above in accordance with the first through the fourth embodiments.

Figure 19:
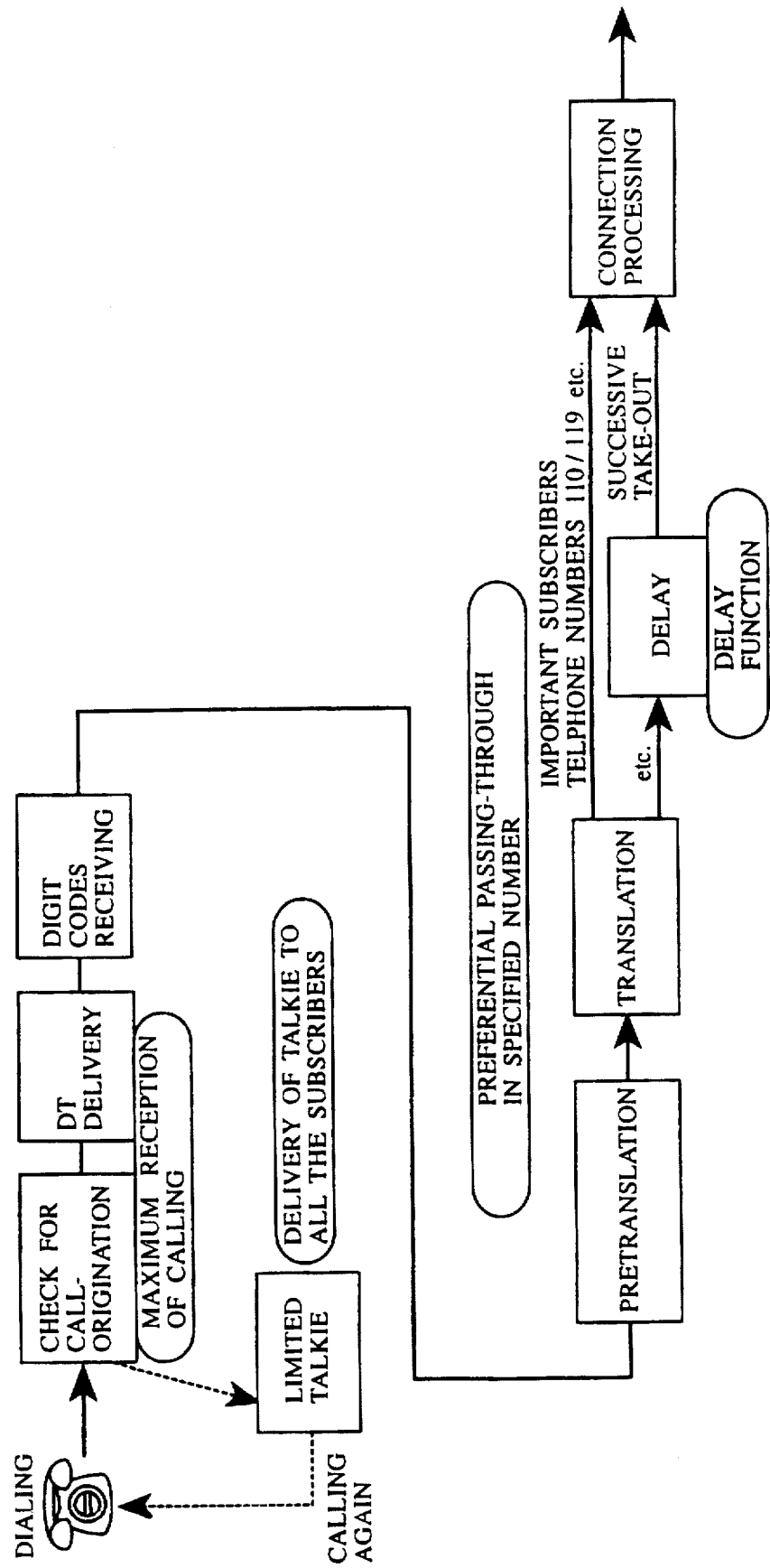
FIG. 19 is a flowchart for explaining the control system of call processing according to the present invention.

As is apparent from the first through the fourth embodiments, the control system for the call processing according to the present invention is carried out as shown in FIG. 19.

In FIG. 19, when subscribers attempt originating calls, the call attempts are accepted to be originating class at the maximum in accordance with the present invention without requiring the originating call restriction as in the prior art shown in FIG. 1. Then, a check for call-origination, a DT delivery (see FIG. 6), and the pre-translation according to the present invention after reception of digit codes are carried out with respect to the calls accepted. More specifically, up to the processes of digit codes accumulation, digit figure decision, and determination whether or not each call is a specified call are processed in peripheral circuits of an exchange main body processor. These results thus obtained are then delivered collectively from the peripheral circuits to the main body processor in accordance with the present invention, and the results are subjected to translation by means of call processing software on the main body processor, so that connection processing is preferentially carried out in accordance with the determination results added, if a call corresponds to the specified call.

As described above, since the digit figure decision is not effected in the main body processor in accordance with the present invention, a load of the main body processor relating to reception of digit codes can significantly be reduced. Accordingly, a capacity of the main body processor corresponding to the load can be used for call processing, so that it becomes possible to be from 1.2 to 1.3 times higher a threshold value of the number of calls in case of originating call restriction than that of a prior art, whereby the number of calls which is receivable can be increased.

Figure 20A:
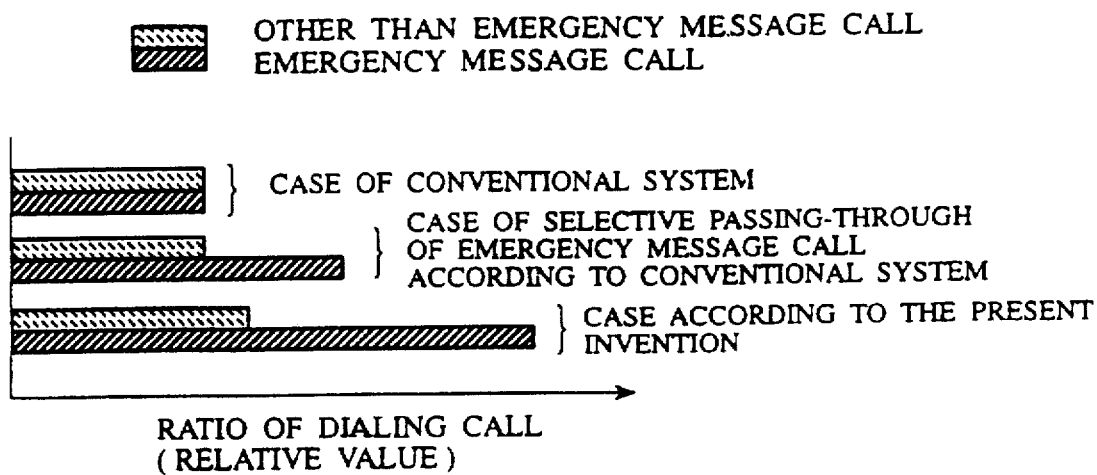
FIG. 20A and FIG. 20B are graphical representations each explaining advantages of the present invention.
Figure 20B:
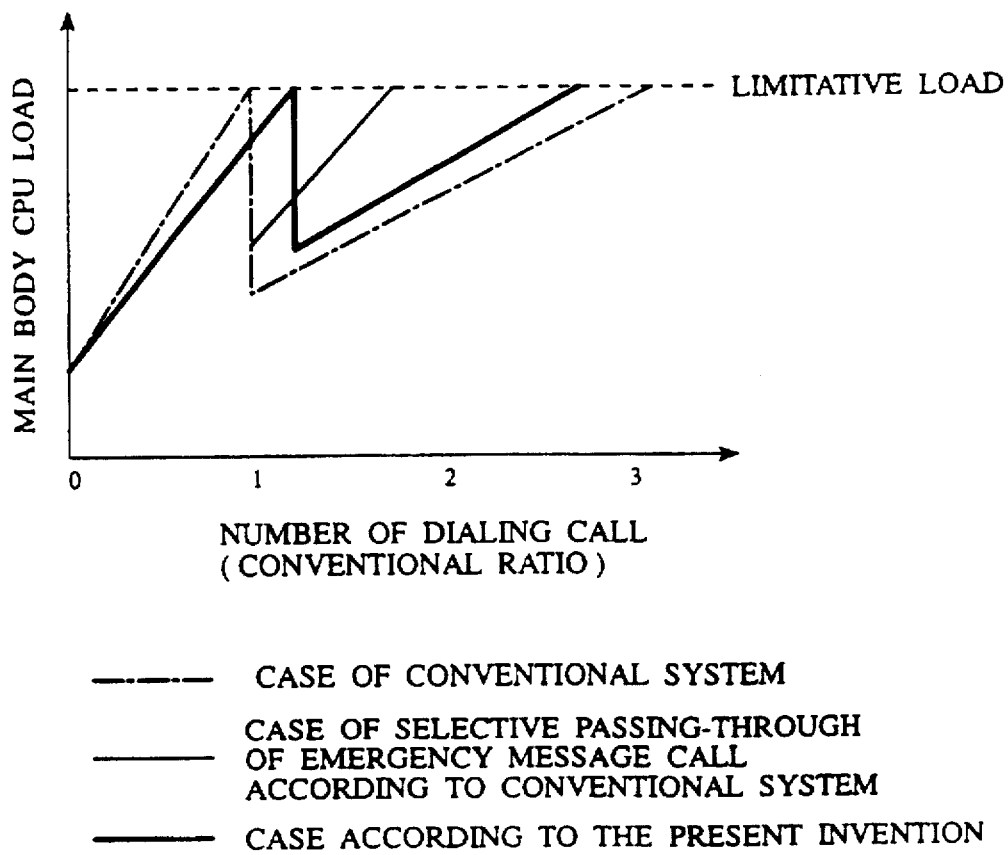

FIG. 20A and FIG. 20B are graphical representations for explaining the above-mentioned advantages according to the present invention wherein FIG. 20A is a representation indicating a region of calling ratio which is 100% practicable with respect to the connection processing of callings from non-preferential subscribers, and FIG. 20B is a graph indicating a relationship between the number of calls and a load of the main body processor (CPU) in which illustrated are three cases, i.e. [upper case] a case of a conventional control system, [middle case] a case of the conventional system wherein emergency message calls are selectively passed through without accompanying originating call restriction, and [lower case] a case of the present invention.

As is apparent from FIG. 20A, according to the present invention, more calls can be connected than that in a conventional system, and further much more connections becomes possible with respect to an emergency message call. Furthermore, as is apparent from FIG. 20B, according to the present invention, the number of calls until the main body processor reaches initially the limited load can be increased as compared with that of prior art, and even after once reached the limited load (originating call restriction was made), more calls than that of prior art can be processed by the amount corresponding to the emergency message call.

When an attempt call is rejected without allowing an opportunity for delivering a telephone number of the callee party from a caller dialed, there is such a tendency that the caller repeats impetuously the call attempt. However, when an exchange receives once the telephone number of a callee party delivered from a caller and connection processing is then carried out with respect to a specified call such as emergency message call and the like, or when such processing that general calls other than the specified call are connected to announcement processing to hold a standby situation, a sudden raise in calling ratio can be suppressed.

It is to be noted that the call selecting apparatuses from 101 to 104 according to the present invention have a function of originating call restriction being a final protective mechanism for preventing the exchange from occurrence of system down as in conventional apparatuses. The "originating call restriction" means that as mentioned above, when there are calls exceeding a certain ratio (limited load) with respect to a call processing capacity in the main body processor, the processing as to the calls is limited. In this respect, however, before starting up the originating call restriction in the apparatus according to the present invention, at least three times higher calling ratio is allowable in the present invention than that of conventional apparatuses. In case of a calling ratio exceeding the limited load, when there is a specified call such as emergency message calls or the like, it is possible to more preferentially connect such specified call than the other calls without employing the originating call restriction, even if the call is attempted by a general subscriber. Moreover, since a capacity for call processing in the main body processor can significantly be improved as compared with conventional apparatuses, a specified call such as emergency message calls or the like can be preferentially connected sufficiently even in case of dialing over crowding. According to a performance prediction by means of a practical parameter, since there is room of 1000 times or more for the processing capacity of call determination function by means of an associative memory, the processing speed is not adversely affected thereby even in case of congestion where the originating call restriction must be taken.

In short, according to the present invention, before reaching the limited load, calls can be accepted at the maximum up to the limit of the limited load, and even when calls exceed the limit (in case of originating call congestion), a specified call can sufficiently be preferentially connected.

Furthermore, in the present invention, such telephone number information as to specified calls such as emergency message calls and the like can be updated. As a result, for example, even if an emergency message call number differs in every countries, when the data of the telephone number are updated, the same exchange system can be utilized in different territories and countries. Furthermore, even if there are changes in local telephone numbers, additions and changes in new telephone service numbers (service prefix), and additions and changes in service prefixes for mutual connection with other telecommunication trade associations, it can easily cope with such situations without alteration of the hardware, when the data in the associative memories are reloaded. Besides, when there is an emergency message call from a so-called CES service or a VPN service subscriber, according to the manner of the present invention, the dial number of an emergency message call which is dialed succeeding to a CES or VPN outside line prefix (e.g. 0 or 9) can be determined.

Finally, the advantages obtained by the present invention will be summarized hereinbelow.

According to the present invention, after the completion of digit figure decision processing of digit codes received, the result of determination whether a call is a specified calls or not is transmitted simultaneously with all the digit codes accumulated to the main body processor which functions for call connection processing, whereby a selection of emergency message call becomes possible without starting up a translation program (translator) by the main body processor. According to the present invention, since only specified calls such as an emergency message call or the like are informed to the main body processor, the specified call can selectively be passed through even in case of originating call congestion.

According to the present invention, since a mechanism for identifying simultaneously a digit figure decision with specified calls operates always irrespective of the case where the corresponding exchange is in an congestion situation or not, a load of the main body processor which processes the call connection immediately after the switch at a line concentration stage can be reduced.

According to the present invention, the destination telephone number which should be preferentially passed through as a specified call even in case of congestion becomes easily alter able by merely reloading the data in the digit figure decision/call determination section.

Furthermore, it is to be noted that the digit figure decision/call determination section can be realized by the use of a general-purpose microprocessor as a matter of course. In this case, however, a processing speed thereof is inferior to that of the digit figure decision/call determination section in the above-mentioned embodiments.

It should be understood that many modifications and adaptations of the invention will become apparent to those skilled in the art it is intended to encompass such obvious modifications and changes in the scope of the claims appended hereto.

What is claimed is:

1. A call selecting apparatus, comprising: a signal receiver means for receiving dial signals in the form of dial pulse or DTMF;
    a received digit codes accumulating means, provided as a peripheral device of a control means and connected to the signal receiver means, for receiving the dial signals from the signal receiver means to accumulate digit codes denoted by the dial signals;
    a digits number decision/call determination means, provided as a peripheral device of said control means and connected to the received digit codes accumulating means, for receiving the digit codes from said received digit codes accumulating means to decide the number of digits of the digit codes and to determine whether the digit codes correspond to a specific destination telephone number or not; and
    said control means, connected to said digits number decision/call determination means, for collectively inputting the digit codes and a result of the determination from said digits number decision/call determination means and performing a processing of connection to a destination specified by the input digit codes.

2. A call selecting apparatus as claimed in claim 1 wherein said digits number decision/call determination means decides the number of digits of the digit codes and determines whether the digit codes correspond to a specific destination telephone number or not asynchronously with the receiving of the dial signals by means of said signal receiver means.

3. A call selecting apparatus as claimed in claim 1 wherein said digits number decision/call determination means executes the decision of the number of digits of the digit codes simultaneously with the determination of whether the digits codes correspond to the specific destination telephone number.

4. A call selecting apparatus as claimed in claim 1 wherein said digits number decision/call determination means comprises a writable storing means for storing the specific destination telephone number.

5. A call selecting apparatus as claimed in claim 1 wherein said specific destination telephone number comprises an emergency message call telephone number.

6. A call selecting apparatus as claimed in claim 1 wherein said control means performs preferentially the processing of the connection as to the digit codes when the result of the determination shows that the digit codes correspond to the specific destination telephone number under congestion control of call originating.

7. A call selecting apparatus as claimed in claim 6 wherein said digits number decision/call determination means decides the number of digits of the digit codes and determines whether the digit codes correspond to a specific destination telephone number or not asynchronously with the receiving of the dial signals by means of said signal receiver means.

8. A call selecting apparatus as claimed in claim 6 wherein said digits number decision/call determination means executes the decision of the number of digits of the digit codes simultaneously with the determination of whether the digits codes correspond to the specific destination telephone number.

9. A call selecting apparatus as claimed in claim 6 wherein said digits number decision/call determination means comprises a writable storing means for storing the specific destination telephone number.

10. A call selecting apparatus as claimed in claim 6 wherein said specific destination telephone number comprises an emergency message call telephone number.

* * * * *

UNITED STATES PATENT AND TRADEMARK OFFICE
CERTIFICATE OF CORRECTION

PATENT NO. : 5,734,698

DATED : March 31, 1998

INVENTOR(S) : Kobayashi, et al.

It is certified that error appears in the above-identified patent and that said Letters Patent is hereby corrected as shown below:

Item [73]

Cover page reads "Assignee: Miyoshi & Miyoshi, Tokyo, Japan" and should read --Assignee: Nippon Telegraph and Telephone Corporation, Tokyo Japan Signed and Sealed this Third Day of November, 1998

*Attest:*

BRUCE LEHMAN

*Attesting Officer*     *Commissioner of Patents and Trademarks*